United States Patent
Rhee et al.

(10) Patent No.: US 10,776,618 B2
(45) Date of Patent: Sep. 15, 2020

(54) MOBILE TERMINAL AND CONTROL METHOD THEREFOR

(71) Applicant: LG ELECTRONICS INC., Seoul (KR)

(72) Inventors: Eunjoo Rhee, Seoul (KR); Soungmin Im, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 34 days.

(21) Appl. No.: 15/776,763

(22) PCT Filed: Nov. 19, 2015

(86) PCT No.: PCT/KR2015/012477
§ 371 (c)(1),
(2) Date: May 16, 2018

(87) PCT Pub. No.: WO2017/086508
PCT Pub. Date: May 26, 2017

(65) Prior Publication Data
US 2018/0349690 A1 Dec. 6, 2018

(51) Int. Cl.
*G06K 9/00* (2006.01)
*G06F 3/0484* (2013.01)
(Continued)

(52) U.S. Cl.
CPC ......... *G06K 9/00375* (2013.01); *G06F 3/005* (2013.01); *G06F 3/011* (2013.01);
(Continued)

(58) Field of Classification Search
None
See application file for complete search history.

(56) References Cited

U.S. PATENT DOCUMENTS

| 8,502,651 B2* | 8/2013 | Birnbaum | A63F 13/10 340/407.2 |
| 2004/0174337 A1* | 9/2004 | Kubota | G06F 3/014 345/156 |

(Continued)

FOREIGN PATENT DOCUMENTS

| KR | 20100027976 | 3/2010 |
| KR | 20120010374 | 2/2012 |

(Continued)

OTHER PUBLICATIONS

Avizzano, Carlo Alberto, Antonio Frisoli, and Massimo Bergamasco. "Design guidelines for generating force feedback on fingertips using haptic interfaces." Human haptic perception: Basics and applications. Birkhäuser Basel, 2008. 393-410. (Year: 2008).*

(Continued)

*Primary Examiner* — Xin Sheng
(74) *Attorney, Agent, or Firm* — Lee, Hong, Degerman, Kang & Waimey

(57) ABSTRACT

The mobile terminal comprises: a body formed to be worn on a head part of a user; a display unit disposed at the front side of the body and formed to display a virtual space including a virtual object; a plurality of cameras formed to detect a user's hand existing within the virtual space; a plurality of feedback signal units arranged to be spaced apart from each other to output feedback signals in different directions; and a control unit for, when the user's hand approaches or contacts a virtual object included in the virtual space, detecting a particular part of the user's hand approaching or contacting the virtual object on the basis of a plurality of pieces of sensing information received from the plurality of cameras, and controlling the plurality of feedback signal units to cause feedback signals having different directions to reach the particular part.

19 Claims, 19 Drawing Sheets

(51) Int. Cl.
*H04N 13/344* (2018.01)
*G06K 9/22* (2006.01)
*G06F 3/0481* (2013.01)
*G06F 3/01* (2006.01)
*H04N 13/239* (2018.01)
*H04M 1/725* (2006.01)
*H04M 1/05* (2006.01)
*G06K 9/20* (2006.01)
*G06T 7/13* (2017.01)
*H04N 13/293* (2018.01)
*G06F 3/00* (2006.01)
*G06T 19/00* (2011.01)

(52) U.S. Cl.
CPC .............. *G06F 3/012* (2013.01); *G06F 3/016* (2013.01); *G06F 3/017* (2013.01); *G06F 3/04815* (2013.01); *G06F 3/04842* (2013.01); *G06K 9/00201* (2013.01); *G06K 9/00355* (2013.01); *G06K 9/2054* (2013.01); *G06K 9/22* (2013.01); *G06T 7/13* (2017.01); *G06T 19/006* (2013.01); *H04M 1/05* (2013.01); *H04M 1/72544* (2013.01); *H04N 13/239* (2018.05); *H04N 13/293* (2018.05); *H04N 13/344* (2018.05); *G06F 3/014* (2013.01); *H04M 2250/52* (2013.01)

(56) References Cited

U.S. PATENT DOCUMENTS

| | | | | |
|---|---|---|---|---|
| 2011/0248918 | A1* | 10/2011 | Yoo | G06F 3/011 345/157 |
| 2014/0125469 | A1* | 5/2014 | Smith | G08B 6/00 340/407.2 |
| 2014/0266647 | A1* | 9/2014 | Visitacion | G08B 6/00 340/407.1 |
| 2014/0306891 | A1* | 10/2014 | Latta | G06F 3/017 345/158 |
| 2016/0187974 | A1* | 6/2016 | Mallinson | G06F 3/014 463/32 |

FOREIGN PATENT DOCUMENTS

KR 20140070326 6/2014
KR 20140113531 9/2014

OTHER PUBLICATIONS

PCT International Application No. PCT/KR2015/012477, International Search Report dated Aug. 24, 2016, 2 pages.

* cited by examiner (a)　　　　　　　　(b)　　　　　　　　(c)

(a)

(b)

(c)

(d)

MOBILE TERMINAL AND CONTROL METHOD THEREFOR

CROSS-REFERENCE TO RELATED APPLICATIONS

This application is the National Stage filing under 35 U.S.C. 371 of International Application No. PCT/KR2015/012477, filed on Nov. 19, 2015, the contents of which are all hereby incorporated by reference herein in its entirety.

BACKGROUND OF THE INVENTION

1. Field of the Invention

The present disclosure relates to a mobile terminal capable of implementing virtual reality and a control method thereof.

2. Description of the Related Art

Terminals may be classified into mobile/portable terminals and stationary terminals according to their mobility. Furthermore, mobile terminals may be divided into handheld terminals and vehicle mounted terminals according to whether or not it can be directly carried by a user.

The functions of mobile terminals have been diversified. For example, the functions may include data and voice communication, photographing and video shooting through a camera, voice recording, music file playback through a speaker system, and displaying an image or video on a display unit. Some terminals further include an electronic game play function or perform a multimedia player function. In particular, in recent years, mobile terminals may receive multicast signals that provide visual content such as broadcast, video or television programs.

As it becomes multifunctional, for example, such a terminal is allowed to capture still images or moving images, play music or video files, play games, receive broadcast and the like, so as to be implemented as an integrated multimedia player.

In order to support and enhance the functions of the terminal, the improvement of structural or software elements of the terminal may be taken into consideration.

In recent years, technologies for implementing virtual reality in a mobile terminal mounted on a user's head portion, that is, a head mounted display (HMD), have been developed. When virtual reality is implemented in front of eyes on an HMD, the virtual reality may be provided in front of the user's eyes to increase the realism.

Meanwhile, in the technical field of a mobile terminal providing virtual reality, various technologies are being developed to increase the realism of the virtual reality. Accordingly, the present disclosure proposes a method for providing virtual reality in a more realistic manner.

SUMMARY OF THE INVENTION

An object of the present disclosure is to provide a realistic interaction between virtual reality and a user.

Another object of the present disclosure is to provide a method for a user who views virtual reality to feel a virtual object included in the virtual reality in a more realistic manner.

The present disclosure may include a main body formed to be worn on a head of a user, a display unit disposed on a front surface of the main body, and formed to display a virtual space including a virtual object, a plurality of cameras formed to sense a hand of a user existing in the virtual space, a plurality of feedback signal units spaced apart from each other to output feedback signals in different directions, and a controller configured to detect a specific part of the user's hand in contact with or in proximity to the virtual object based on a plurality of sensing information received from the plurality of cameras when the user's hand is in contact with or in proximity to a virtual object included in the virtual space, and control the plurality of feedback signal units to transmit feedback signals having different directions to the specific part.

According to an embodiment, the plurality of feedback signal units may be disposed in an edge region of the main body to output feedback signals to an edge of the specific part of the user's hand.

According to an embodiment, the plurality of cameras may be spaced apart from each other to sense a user's hand at different angles.

According to an embodiment, the controller may output a different feedback signal according to an area of a specific part of a user's hand in contact with or in proximity to the virtual object.

According to an embodiment, the controller may output a different feedback signal according to a relative position between the virtual object and each of a plurality of parts of the user's hand.

According to an embodiment, the controller may output a feedback signal at a first intensity when a relative distance between the virtual object and a specific part of the user's hand is a first distance, and output a feedback signal at a second intensity lower than the first intensity when a relative distance between the virtual object and a part different from the specific part of the user's hand is a second distance larger than the first distance.

According to an embodiment, the controller may detect a gesture of the user's hand, and output a different feedback signal according to the gesture of the user's hand.

According to an embodiment, the controller may change at least one of a frequency, an amplitude, and a waveform of the feedback signal to output a different feedback signal.

According to an embodiment, the controller may detect a position of the user's hand in the virtual space, and determine at least one feedback signal unit to output a feedback signal among the plurality of feedback signal units according to the position of the user's hand.

According to an embodiment, when at least one of the plurality of feedback signal units is controlled not to output a feedback signal based on a preset condition, the controller may control the remaining feedback signal units excluding the at least one feedback signal unit to sequentially output feedback signals to the specific part.

According to an embodiment, the preset condition may be a condition in which either one of a plurality of user's hands existing in the virtual space is located between the other one thereof and an output path of a signal of a specific feedback signal unit.

According to an embodiment, the controller may generate a virtual image corresponding to the user's hand based on a plurality of sensing information received from the plurality of cameras, and determine whether the virtual object is in contact with or in proximity to the virtual object based on a relative distance between the virtual image and the virtual object.

According to an embodiment, the controller outputs a different feedback signal according to the type of the virtual object when the virtual object and the user's hand are in contact or in proximity to each other.

According to an embodiment, the controller may control the plurality of feedback signal units to limit the feedback signal from reaching a part of the user's hand excluding the specific part.

According to an embodiment, when notification information related to the virtual object is generated in a state where the user's hand existing out of the virtual space is sensed, the controller may control the plurality of feedback signal units to allow feedback signals to reach the user's hand or the like.

In a method of controlling a mobile terminal according to another embodiment of the present disclosure, the method may include displaying a virtual space including a virtual object, sensing a user's hand existing in the virtual space through a plurality of cameras, detecting a specific part of a user's hand in contact with or in proximity to the virtual object based on a plurality of sensing information received from the camera when the user's hand is in contact with or in proximity to the virtual object included in the virtual space, and outputting feedback signals through a plurality of feedback signal units to allow feedback signals having different directions to reach the specific part.

According to an embodiment, the plurality of feedback signal units may be spaced apart from each other.

According to an embodiment, said outputting feedback signals may control a plurality of feedback signal units not to output feedback signals to the remaining parts excluding the specific part of the user's hand.

According to an embodiment, said outputting feedback signals may output a different feedback signal according to an area of the specific part of the user's hand in contact with or in proximity to the virtual object.

According to an embodiment, said outputting feedback signals may output a different feedback signal according to a shape of a user's hand in contact with or in proximity to the virtual object.

The present disclosure may transmit a feedback signal to a specific part of a user's hand touching a virtual object included in virtual reality. Through this, the user may feel the feeling of touching a virtual object in virtual reality in a more realistic manner.

Furthermore, the present disclosure may transmit a feedback signal to an edge of a user's hand, that is, a part closest to the palm, thereby allowing user to feel as if he or she touches a virtual object in reality.

In addition, the present disclosure may output a different feedback signal according to an area of the user's hand in contact with a virtual object or a gesture of his or her hand, thereby providing a user with an experience of touching a real object.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1A:
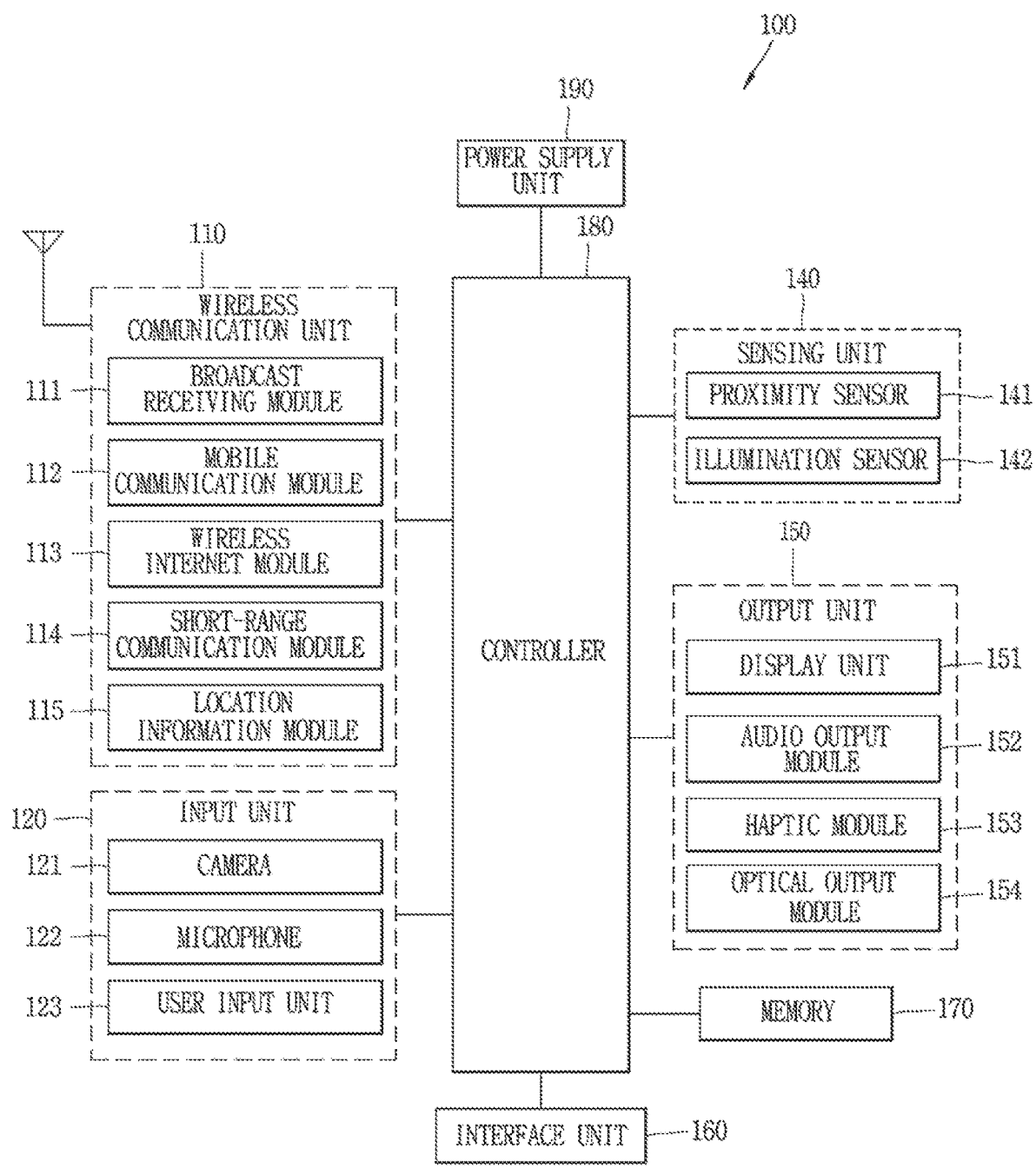
FIG. 1A is a block diagram for explaining a mobile terminal associated with the present disclosure.

Hereinafter, the embodiments disclosed herein will be described in detail with reference to the accompanying drawings, and the same or similar elements are designated with the same numeral references regardless of the numerals in the drawings and their redundant description will be omitted. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. On the contrary, in case where an element is "directly connected" or "directly linked" to another element, it should be understood that any other element is not existed therebetween.

A singular representation may include a plural representation as far as it represents a definitely different meaning from the context.

Terms "include" or "has" used herein should be understood that they are intended to indicate the existence of a feature, a number, a step, a constituent element, a component or a combination thereof disclosed in the specification, and it may also be understood that the existence or additional possibility of one or more other features, numbers, steps, constituent elements, components or combinations thereof are not excluded in advance.

Mobile terminals described herein may include cellular phones, smart phones, laptop computers, digital broadcasting terminals, personal digital assistants (PDAs), portable multimedia players (PMPs), navigators, slate PCs, tablet PCs, ultrabooks, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers, digital signages, and the like, excluding a case of being applicable only to the mobile terminals.

Figure 1B:
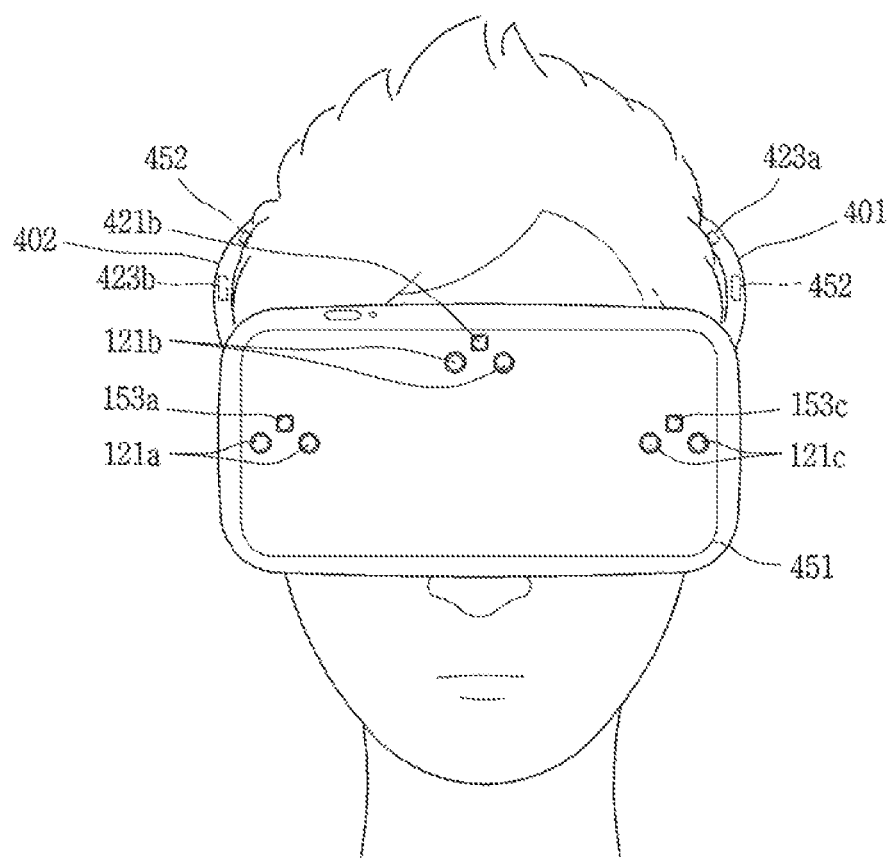
FIG. 1B is a conceptual view illustrating an example of a mobile terminal associated with the present disclosure.

Referring to FIGS. 1A through 1C, FIG. 1A is a block diagram for explaining a mobile terminal associated with the present disclosure, and FIG. 1B is a conceptual view illustrating one example of the mobile terminal associated with the present disclosure.

The mobile terminal 100 may include components, such as a wireless communication unit 110, an input unit 120, a sensing unit 140, an output unit 150, an interface unit 160, a memory 170, a controller 180, a power supply unit 190 and the like. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and an external server. In addition, the wireless communication unit 110 may include one or more modules for connecting the mobile terminal 100 to one or more networks.

The wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

In the mobile terminal according to the present disclosure, the camera 121 may include a 3D (dimension) camera or a depth camera. The present disclosure may be configured to sense a human body (or a user's hand) located on a virtual space (or a preset space) through which a virtual object is displayed through an image sensor provided in a 3D camera (depth camera). Such an image sensor may be configured to sense a user human body while sensing a user gesture in the arbitrary space. In a mobile terminal according to the present disclosure, a 3D image (or a three-dimensional (3D) image) having a three-dimensional effect corresponding to a target object (or a human body) approaching a virtual object may be acquired through the 3D camera.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). The mobile terminal 100 may be configured to utilize information obtained from sensing unit 140, and in particular, information obtained from one or more sensors of the sensing unit 140, and combinations thereof.

The output unit 150 may be configured to output an audio signal, a video signal or a tactile signal. The output unit 150 may include a display unit 151, an audio output module 152, a haptic module 153, an optical output unit 154 and the like. The display unit 151 may have an inter-layered structure or an integrated structure with a touch sensor in order to facilitate a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

In addition, the memory 170 stores data that support various functions of the mobile terminal 100. The memory 170 is typically implemented to store data to support various functions or features of the mobile terminal 100. For instance, the memory 170 may be configured to store application programs executed in the mobile terminal 100, data or instructions for operations of the mobile terminal 100, and the like. At least part of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

Furthermore, the controller 180 may control at least part of the components illustrated in FIG. 1A, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Furthermore, the operation and control or the control method of the mobile terminal may be implemented in the mobile terminal in such a manner of activating at least one application program stored in the memory 170.

Hereinafter, each aforementioned component will be described in more detail with reference to FIG. 1A, prior to explaining various exemplary embodiments implemented by the mobile terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and/or a terrestrial channel. At least two broadcast receiving modules 111 may be provided in the portable electronic device 100 to simultaneously receive at least two broadcast channels or switch the broadcast channels.

The mobile communication module 112 may transmit/receive wireless signals to/from at least one of network entities, for example, a base station, an external terminal, a server, and the like, on a mobile communication network, which is constructed according to technical standards or transmission methods for mobile communications (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.)

Here, the wireless signals may include audio call signal, video (telephony) call signal, or various formats of data according to transmission/reception of text/multimedia messages.

The wireless Internet module 113 refers to a module for supporting wireless Internet access, and may be built-in or externally installed on the mobile terminal 100. The wireless Internet module 113 may transmit and/or receive wireless signals via communication networks according to wireless Internet technologies.

Examples of such wireless Internet access may include Wireless LAN (WLAN), Wireless-Fidelity (Wi-Fi), Wireless Fidelity Direct (Wi-Fi Direct), Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), LTE (Long Term Evolution), LTE-A (Long Term Evolution-Advanced), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LTE, LTE-A and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks. The short-range communication module 114 denotes a module for short-range communications.

Here, the another mobile terminal 100 may be a wearable device, for example, a smart watch, smart glasses or a head mounted display (HMD), which is able to exchange data with the mobile terminal 100 (or to like data with the mobile terminal 100). The short-range communication module 114 may sense (recognize) a wearable device, which is able to communicate with the mobile terminal), near the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a WiFi module, or both. For example, when the mobile terminal uses the GPS module, a position of the mobile terminal may be acquired using a signal sent from a GPS satellite. For another example, when the mobile terminal uses the Wi-Fi module, a position of the mobile terminal may be acquired based on information associated with a wireless access point (AP) which transmits or receives a wireless signal to or from the Wi-Fi module. According to the need, the location information module 115 may perform any function of the other modules of the wireless communication unit 110 to obtain data on the location of the mobile terminal. As a module used to acquire the location (or current location) of the mobile terminal, the location information module 115 may not be necessarily limited to a module for directly calculating or acquiring the location of the mobile terminal.

Next, the input unit 120 may be configured to provide an audio or video signal (or information) input to the mobile terminal or information input by a user to the mobile terminal. For the input of the audio information, the mobile terminal 100 may include one or a plurality of cameras 121. The camera 121 processes an image frame, such as still picture or video, acquired by an image sensor in a video phone call or image capturing mode. The processed image frames may be displayed on the display unit 151. On the other hand, the plurality of cameras 121 disposed in the mobile terminal 100 may be arranged in a matrix configuration. By use of the cameras 121 having the matrix configuration, a plurality of image information having various angles or focal points may be input into the mobile terminal 100. As another example, the cameras 121 may be located in a stereoscopic arrangement to acquire left and right images for implementing a stereoscopic image.

The microphone 122 may process an external audio signal into electric audio data. The processed audio data may be utilized in various manners according to a function being executed in the mobile terminal 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the mobile terminal 100 to correspond to the input information. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input means may be a virtual key, a soft key or a visual key, which is displayed on a touch screen through software processing, or a touch key which is disposed on a portion except for the touch screen. On the other hand, the virtual key or the visual key may be displayable on the touch screen in various shapes, for example, graphic, text, icon, video or a combination thereof.

On the other hand, the sensing unit 140 may sense at least one of internal information of the mobile terminal, surrounding environment information of the mobile terminal and user information, and generate a sensing signal corresponding to it. The controller 180 may control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may also be categorized as a proximity sensor.

On the other hand, for the sake of brief explanation, a behavior in which the pointer is positioned to be proximate onto the touch screen without contact will be referred to as "proximity touch," whereas a behavior in which the pointer substantially comes into contact with the touch screen will be referred to as "contact touch." For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving state, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, the touch object body may be a finger, a touch pen or stylus pen, a pointer, or the like as an object through which a touch is applied to the touch sensor.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swype touch, a hovering touch, and the like.

An ultrasonic sensor may be configured to recognize position information relating to a sensing object by using ultrasonic waves. The controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 constructing the input unit 120 may be a type of camera sensor. The camera sensor may include at least one of a photo sensor (or image sensor) and a laser sensor.

Implementing the camera 121 with a laser sensor may allow detection of a touch of a physical object with respect to a 3D stereoscopic image. The camera 121 and the laser sensor may be combined to detect a touch of the sensing object with respect to a 3D stereoscopic image. More specifically, the photo sensor is integrated with photo diodes and transistors in the rows and columns thereof, and a content placed on the photo sensor may be scanned by using an electrical signal that is changed according to the amount of light applied to the photo diode. Namely, the photo sensor may calculate the coordinates of the sensing object according to variation of light to thus obtain position information of the sensing object.

The display unit 151 may display (output) information processed in the mobile terminal 100. For example, the display unit 151 may display execution screen information of an application program driven in the mobile terminal 100 or user interface (UI) and graphic user interface (GUI) information in response to the execution screen information.

Furthermore, the display unit 151 may also be implemented as a stereoscopic display unit for displaying stereoscopic images.

The stereoscopic display unit may employ a stereoscopic display scheme such as stereoscopic scheme (a glass scheme), an auto-stereoscopic scheme (glassless scheme), a projection scheme (holographic scheme), or the like.

In general, a 3-dimensional stereoscopic image may include a left image (image for the left eye) and a right image (image for the right eye). The method of implementing a 3-dimensional stereoscopic image can be divided into a top-down method in which a left image and a right image are disposed at the top and bottom within a frame, a left-to-right (L-to-R) or side by side method in which a left image and a right image are disposed at the left and right within a frame, a checker board method in which the pieces of a left image and a right image are disposed in a tile format, an interlaced method in which a left and a right image are alternately disposed for each column and row unit, and a time sequential or frame by frame method in which a left image and a right image are alternately displayed for each time frame, according to the method of combining a left image and a right image into a 3-dimensional stereoscopic image.

Also, as for a 3D thumbnail image, a left image thumbnail and a right image thumbnail may be generated from a left image and a right image of an original image frame, respectively, and then combined to generate a single 3D thumbnail image. In general, thumbnail refers to a reduced image or a reduced still image. The thusly generated left image thumbnail and the right image thumbnail may be displayed with a horizontal distance difference therebetween by a depth corresponding to the disparity between the left image and the right image on the screen, providing a stereoscopic space sense.

A left image and a right image required for implementing a 3D stereoscopic image may be displayed on the stereoscopic display unit by a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. Also, the audio output module 152 may also provide audible output signals associated with a particular function (e.g., a call signal reception sound, a message reception sound, etc.) carried out by the mobile terminal 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be configured to transmit tactile effects through a user's direct contact, or a user's muscular sense using a finger or a hand. Two or more haptic modules 153 may be provided according to the particular configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like.

A signal output by the optical output module 154 may be implemented in such a manner that the mobile terminal emits monochromatic light or light with a plurality of colors. The signal output may be terminated as the mobile terminal senses a user's event checking.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identification device") may take the form of a smart card. Accordingly, the identifying device may be connected with the terminal 100 via the interface unit 160.

Furthermore, when the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Such various command signals or power inputted from the cradle may operate as signals for recognizing that the mobile terminal 100 has accurately been mounted to the cradle.

The memory 170 can store programs to support operations of the controller 180 and store input/output data (for example, phonebook, messages, still images, videos, etc.). The memory 170 may store data associated with various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

As aforementioned, the controller 180 may typically control the general operations of the mobile terminal 100. For example, the controller 180 may set or release a lock state for restricting a user from inputting a control command with respect to applications when a state of the mobile terminal meets a preset condition.

Furthermore, the controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the mobile terminal 100.

The power supply unit 190 may receive external power or internal power and supply appropriate power required for operating respective elements and components included in the HMD 100 under the control of the controller 180. The power supply unit 190 may include a battery, which is typically rechargeable or be detachably coupled to the terminal body for charging.

Furthermore, the power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable or its similar medium using, for example, software, hardware, or any combination thereof.

On the other hand, a mobile terminal may extend to a wearable device which is wearable on a human body, going beyond usually using the mobile terminal by a user with grabbing it with a hand. Examples of the wearable device may include a smart watch, a smart glass, a head mounted display (HMD), and so on. Hereinafter, description will be given of examples of a mobile terminal extending to the wearable device.

A wearable device may be configured to exchange data with (or cooperate with) another mobile terminal 100. The short-range communication module 114 may sense (recognize) a wearable device capable of communicating with the mobile terminal in the vicinity of the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

FIG. 1B is a perspective view illustrating an example of a mobile terminal 400 having an HMD formed to be wearable on a head among mobile terminals according to the present disclosure.

The mobile terminal 400 may be configured to be wearable on a head of a human body, and provided with a frame portion (case, housing, etc.) therefor. The frame portion may be made of a flexible material to be easily worn. It is illustrated in the drawing that the frame unit includes a first frame 401 and a second frame 402 with different materials. In general, the mobile terminal 400 having an HMD may include the features of the mobile terminal 100 in FIG. 1A or similar features thereto.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components provided in the mobile terminal 400 having an HMD. The control module 480 may be understood as a component corresponding to the aforementioned controller 180. The drawing illustrates that the control module 480 is installed in the frame part on one side of the head. However, the position of the control module 480 may not be limited to this.

Figure 4:
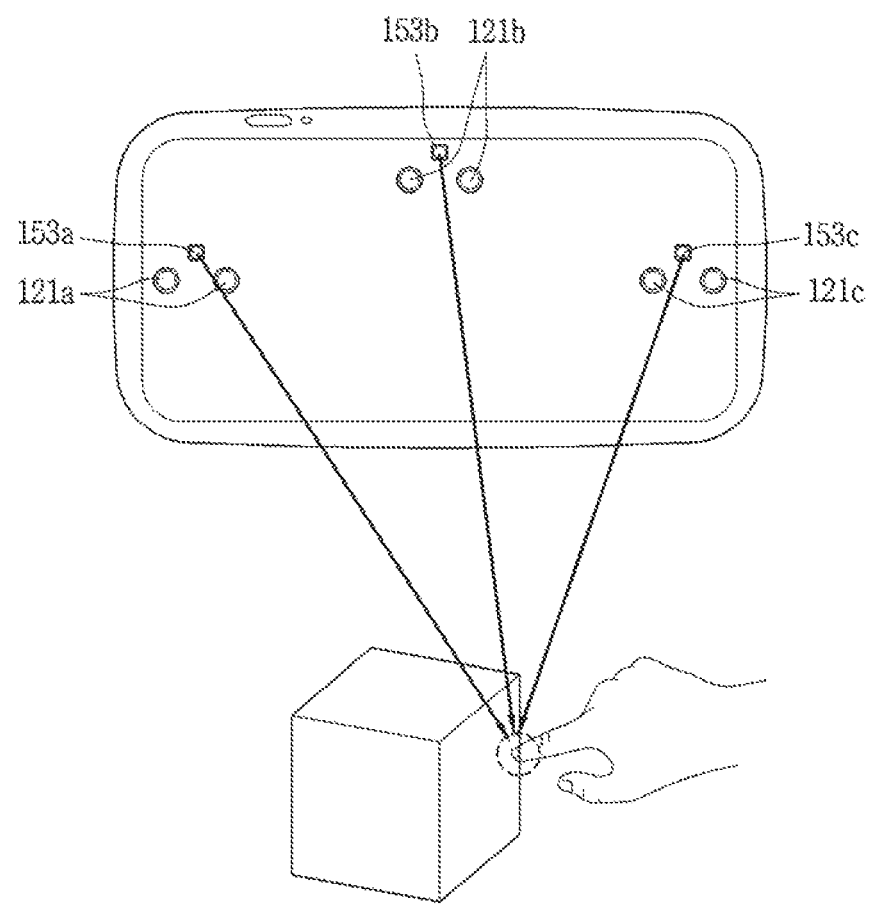
FIG. 4 is a conceptual view illustrating the control method of FIG. 3.

The display unit 451 may be implemented into a type of head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

Furthermore, the display unit 451 may provide virtual reality (VR) formed as a virtual object. Virtual reality is a user interface technology provided to a user to establish an artificial environment that is not real through a software program, and recognize it as an actual environment through the sense of human vision, hearing, and the like in such an artificial environment.

Virtual reality may be understood to have the same meaning as artificial reality, cyber space, virtual worlds, virtual environment, and synthetic environment, and the like.

Such a virtual reality may be implemented through various technologies. For example, in order to implement virtual reality, there are stereo scope, binaural effect, positional tracking, and hololens methods, and the like.

The stereoscopic method is a technology using binocular disparity in which a single object is photographed at different angles to generate a stereoscopic effect of the object using an angle difference between the photographed images.

The binaural effect is a technology for generating a sound similar to a real sound using a phase difference of a sound source.

The positional tracking is a technology for implementing a movement in virtual reality using the position of a user in the real world.

The hololens is a technology for controlling a virtual object in accordance with a user's contact with a virtual object included in the virtual reality.

The camera 121 may be located adjacent to either or both of the left and right eyes to capture an image. Since the camera 121 is located adjacent to the eye, the camera 121 can acquire a scene that the user is currently viewing.

The drawing illustrates that the camera 121 is provided in the control module 480, but the present disclosure may not be limited to this. The camera 121 may be installed on the frame portion or provided in plurality to acquire a stereoscopic image.

For example, as illustrated in FIG. 1B, a plurality of cameras 121a, 121b, 121c may be disposed on a rear surface of a display unit 451 disposed a user's both eyes to acquire a scene directly viewed by the user as an image.

In addition, the cameras 121a, 121b, 121c may be spaced apart from each other in order to capture a user's front image in different directions. For example, the cameras 121a, 121b, 121c may be disposed at the center region and both end regions of the rear surface of the display unit 451, respectively. Through this, the present disclosure may generate a stereoscopic image of an object located in front of the user using a plurality of images captured in different capture directions. This will be described in more detail with reference to FIGS. 5A through 5C.

The mobile terminal 400 having an HMD may include user input units 423a and 423b manipulated by the user to input a control command. The user input unit 423a, 423b may employ any method if it is a tactile manner allowing the user to perform manipulation with a tactile feeling such as touch, push, or the like. The user input units 423a and 423b are shown operable in a pushing manner and a touching manner as they are located on the frame part and the control module 480, respectively.

Moreover, the mobile terminal 400 having an HMD may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

Hereinafter, a mobile terminal having such an HMD is used in common with the term mobile terminal 100 for the sake of convenience of explanation.

Figure 2:
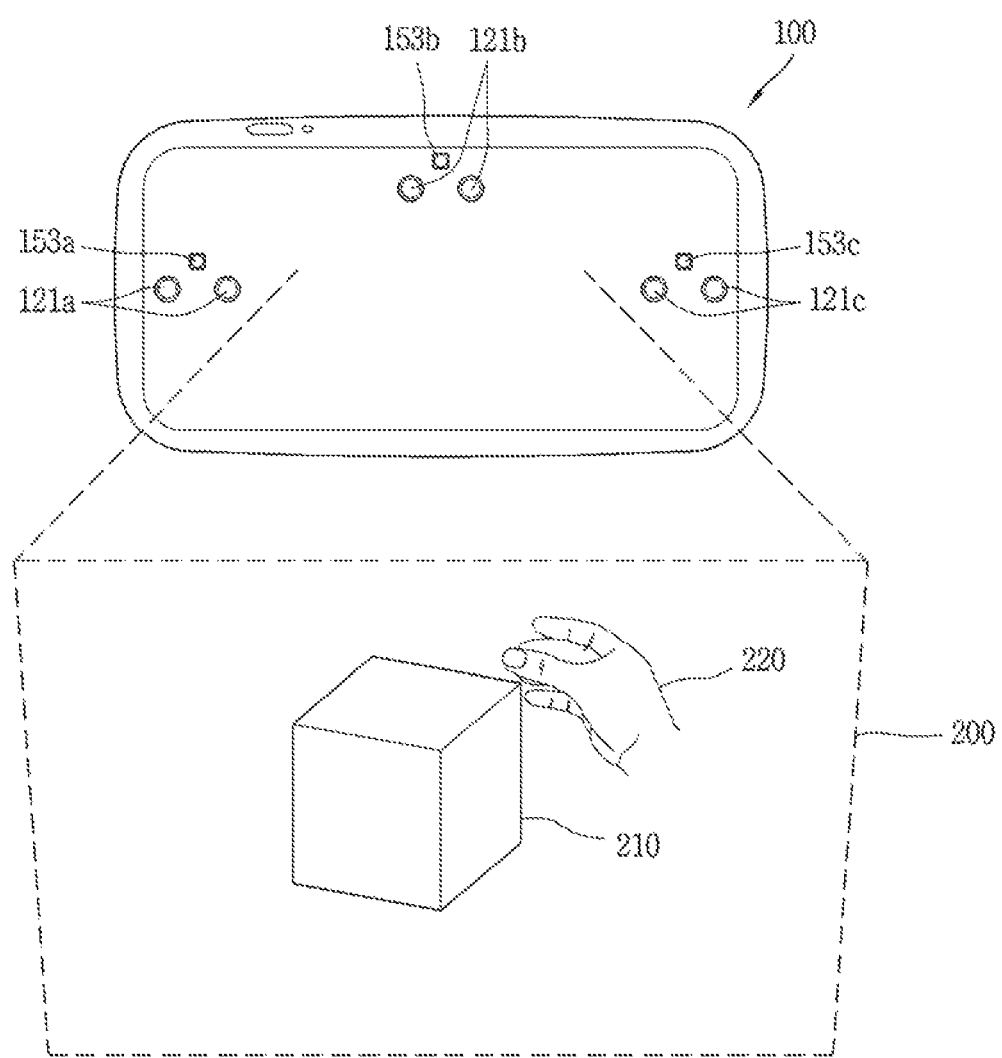
FIG. 2 is a conceptual view illustrating a virtual space in a mobile terminal associated with the present disclosure.

FIG. 2 is a conceptual view illustrating a virtual space implemented in a mobile terminal.

Referring to FIG. 2, a user in virtual reality implemented in the mobile terminal may feel like an experience in which the user himself or herself belongs to a virtual space 200 implementing the virtual reality. Accordingly, the user may take an action such as touching or holding a virtual object 210 included in the virtual space 200 in the same manner as an actual object. Here, the virtual space 200 denotes a preset space in which a 3D stereoscopic image generated by a graphic technology is displayed.

However, since the virtual object included in the virtual space 200 cannot be actually touched or held, the reality of the user experiencing the virtual reality may be reduced. In order to prevent such a problem, the mobile terminal may implement a more realistic virtual space through an interaction between a user in virtual reality and an virtual object.

As part of this interaction, the present disclosure provides tactile feedback to a portion of the user's body (e.g., a user's hand, 220) in contact with or in proximity to a virtual object, thereby providing a tactile sense of touching the virtual object.

Figure 3:
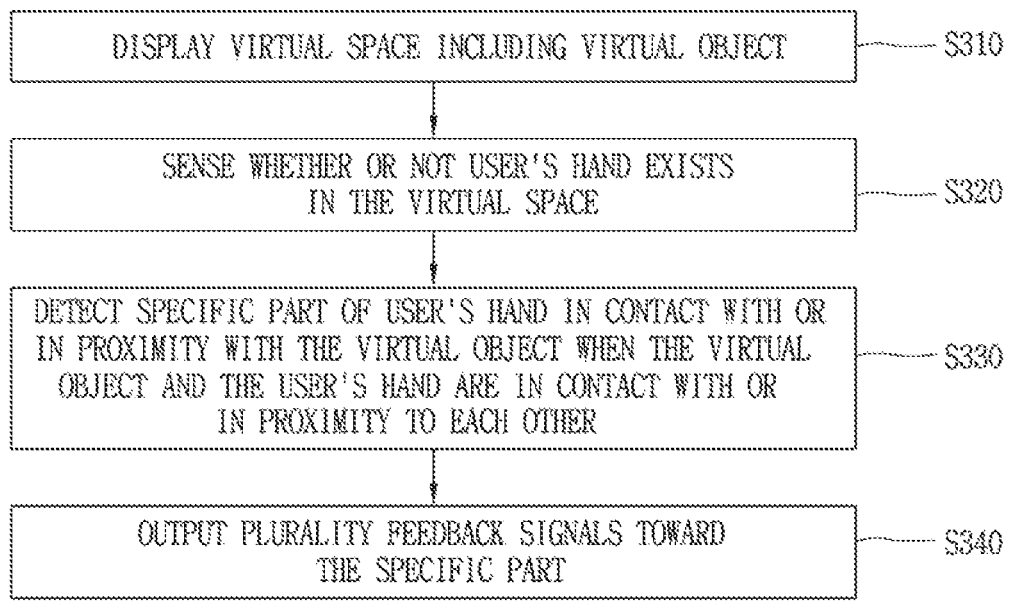
FIG. 3 is a flowchart illustrating a control method for an interaction between a virtual object and a user included in a virtual space in a mobile terminal according to the present disclosure.

Hereinafter, an interaction between a virtual object and a user in the mobile terminal according to the present invention will be described in more detail with reference to the drawings. FIG. 3 is a flowchart for explaining a method of performing an interaction between a virtual object and a user in a mobile terminal according to the present disclosure. FIG. 4 is a conceptual view illustrating the control method of FIG. 3.

First, the controller 180 of the mobile terminal according to the present disclosure may display a virtual space including a virtual object (S310).

The controller 180 may display a virtual space including a virtual object on the display unit 451 (refer to FIG. 1B). The virtual object may denote a virtual image or a virtual image itself technically generated by a computer. For example, the virtual object may be a virtual image corresponding to an arbitrary object. Hereinafter, images included in a virtual space will be described with the term "virtual object".

The virtual object may be displayed in a virtual space. The virtual space may denote a virtual three-dimensional space technically generated by a computer. This virtual space corresponds to a space in virtual reality experienced by a user. Furthermore, the virtual space may be displayed on the display unit 451, and visually provided to the user. On the other hand, the virtual reality may be implemented as a general technology in this field, and thus the detailed description thereof will be omitted herein.

The controller 180 may sense whether or not the user's hand is present in the virtual space (S320).

In the present specification, a case where a user's hand is located in a virtual space will be described as an example, but the present disclosure is not necessarily limited thereto. In other words, in the present disclosure, it may also be possible to sense an object located in the virtual space or a part of the user's body.

Meanwhile, in the present disclosure, it may be possible not to sense a human body located in the virtual space, but sense a human body located out of the virtual space.

The mobile terminal according to the present disclosure may include a sensing unit 140 to sense a user's hand located in a virtual space. For example, the mobile terminal according to the present disclosure may be configured with a 3D camera or a depth camera.

More specifically, in the mobile terminal according to the present disclosure, the camera 121 may include a 3D (dimension) camera or a depth camera. The present disclosure may be configured to sense a human body located on an arbitrary space (or a preset space) through which a virtual object is displayed through an image sensor provided in a 3D camera (depth camera).

Such an image sensor may be configured to sense a user human body while sensing a user's hand in a virtual space. In the mobile terminal according to the present disclosure, it may be possible to acquire a stereoscopic image (three-dimensional (3D) image) corresponding to a target object (or user's hand) approaching the target object (or user's hand) located adjacent to a virtual object or the virtual object, through the 3D camera.

The image sensor may not always be activated but may be present in an active state only when a virtual object is displayed. Furthermore, when the virtual object is displayed, the controller may activate the image sensor to detect the approach of the user's hand to the virtual object when it is sensed that the target object (or the user's hand) is located in the vicinity of the virtual object, through the proximity sensor or illumination sensor.

In addition, a plurality of image sensors may be provided to acquire an image of a user's hand photographed in different directions. In this case, the plurality of image sensors may be spaced apart from each other. For example, the plurality of image sensors may be disposed at both ends and the center of the rear surface of the display unit 451.

Moreover, the controller 180 may activate a plurality of image sensors individually. For example, the controller 180 may activate at least a part or all of the plurality of image sensors based on a preset condition or the user's selection.

As illustrated in FIG. 4, when a virtual object in the virtual space is in contact with or in proximity to a user's hand, the controller 180 may detect a specific part of the user's hand in contact with or in proximity to the virtual object (S330).

The controller 180 may determine whether or not the user's hand detected through the image sensor is in contact with or in proximity to the virtual object in the virtual space. More specifically, the controller 180 may detect a relative position between the user's hand and the virtual object using sensing information acquired through the image sensor. The controller 180 may detect whether the user's hand is in contact with or in proximity to the virtual object based on a relative position between the user's hand and the virtual object.

In addition, the controller 180 may detect a user gesture to the virtual object. The user gesture may denote an operation of a user's hand in which i) the user's hand rubs the virtual object, ii) the user's hand touches the virtual object, iii) the user holds the virtual object with both hands, iv) the user picks the virtual object with a finger, v) the user's hand punches the virtual object, or vi) the user's hand unfolds the virtual object.

The controller 180 may model the user's hand and the virtual object using sensing information acquired from a plurality of image sensors in order to detect a relative position between the virtual object and the user's hands in the virtual space. This modeling method will be described in more detail with reference to FIGS. 5A through 5C.

For example, the controller 180 may detect the coordinate information of a user's hand from sensing information acquired from a plurality of image sensors, and compare the detected coordinate information of the user's hand and the coordinate information of the virtual object in the virtual space to determine the relative position. More specifically, when the coordinate information of the virtual object coincides with or is close to the coordinate of the user's hand, the controller 180 may determine that the user's hand is in contact with or in proximity to the virtual object.

When the user's hand is in contact with or in proximity to the virtual object in the virtual space, the controller 180 may display a plurality of feedback signals toward a specific part of the user's hand (S340).

In the present disclosure, when a virtual object is in contact with or in proximity to a user's hand, a feedback signal may be transmitted to the user to provide a sense of reality to the virtual object.

The feedback signal may be output in at least one of visual, auditory, and tactile methods. For example, the feedback signal may be output in a tactile manner.

In order to output the feedback signal in a tactile manner, the present disclosure may further include a feedback signal unit for outputting a signal in a tactile manner. For example, the feedback signal unit may include at least one of a laser output module and a sound wave output module.

The feedback signal may include at least one of a laser being output through the laser output module, a sound wave (or ultrasonic wave) being output through the sound wave output module, and vapor being output through the mist output module. The laser or sound wave has a constant intensity (e.g., intensity or amplitude), a period (e.g., frequency), a waveform (e.g., pulse wave, sine wave, etc.). This laser or sound wave output through the feedback signal unit is transmitted to the user's hand, through which the user can experience such as actually touching the virtual object. Such a feedback signal may also be referred to as a "haptic signal." It is also possible that the feedback signal unit consists of the haptic module 153.

The controller 180 may acquire the coordinate information of a target point to which a feedback signal being output to the feedback signal unit is to be transmitted based on the coordinate information of a user's hand acquired through modeling of the user's hand in contact with or in proximity to a virtual object. In other words, the controller 180 may use the modeled human coordinate information to transfer a feedback signal to a place where the user's hand is currently located.

Furthermore, the controller 180 may output the feedback signal only to a specific part of the user's hand in contact with the virtual object without transmitting the feedback signal to an arbitrary region of the user's hand. In other words, the controller 180 may acquire the coordinate information (i.e., target point) of a specific part of the user's hand, and output the acquired coordinate information to the target point as a feedback signal. For example, as illustrated in FIG. 4, the controller may transmit a feedback signal only to the user's second finger when the user's second finger is brought into contact with only a virtual object using the modeled coordinate information of the user's hand information.

Furthermore, the controller 180 may transmit the feedback signal to the edge region of the user's hand instead of transmitting the feedback signal to the user's hand. To this end, the mobile terminal according to the present disclosure may include a plurality of feedback signal units spaced apart from each other. For example, as illustrated in FIG. 4, the present disclosure may include feedback signal units 153*a*, 153*b*, 153*c* at both end regions and the center region of the rear surface of the display unit 451, respectively.

In addition, the plurality of feedback signal units may output feedback signals at different positions. For example, referring to FIG. 4, when feedback signal units are provided on both left and right ends of the display unit 451, the plurality of feedback signal units may transmit feedback signals to the left and right edge portions of the user's hand, respectively. Therefore, the plurality of feedback signal units may output feedback signals in different directions.

In other words, according to the present disclosure, when a user is brought into contact with a virtual object, feedback signals may be transmitted in different directions to an edge region of the hand closest to the user's palm, thereby providing a user experience such as allowing the user's palm to be actually brought into contact with the virtual object.

In addition, the plurality of feedback signal units may simultaneously or sequentially output feedback signals.

Moreover, the present disclosure may control the output direction, output intensity, output area, and output frequency of the feedback signals through the plurality of feedback signal units.

On the other hand, when closeness or proximity to the user's hand to the virtual object is detected while the feedback signal unit is inactivated, the controller 180 may switch the feedback signal unit to an active state to output a feedback signal. In other words, the feedback signal unit is normally in an inactive state, and switched to an active state only in a situation where the feedback signal should be output to output a feedback signal. Here, the inactive state denotes an off state, and the active state denotes an on state.

When the plurality of feedback signal units are provided therein, the controller 180 may control the active states of the plurality of signal units, respectively. In other words, the controller 180 may activate all of the plurality of feedback signals to output a plurality of feedback signals, respectively, or may activate only a part of the feedback signal units to output a plurality of feedback signals.

For example, the controller 180 may activate only a part of the plurality of feedback signal units based on a preset condition. Here, the preset condition may be a condition related to a relative position of a user's hand, a characteristic of a virtual object, and the like.

As described above, according to the present disclosure, only when the user's contact or proximity to the virtual object is sensed, the feedback signal unit may be controlled to output a feedback signal, thereby reducing power consumption compared to when the feedback signal unit is always driven in an on state. In addition, according to the present disclosure, only the most appropriate feedback signal unit may be activated among the plurality of feedback signal units to reduce power consumption compared to when all the feedback signal units are activated each time.

Moreover, according to the present disclosure, a feedback signal may be output only to a specific part of the user's hand in contact with the virtual object, using the coordinate information of the user's hand in contact with or in proximity to the virtual object, thereby reducing power consumption compare to when feedback signals are output to all regions, and providing a more realistic tactile experience.

On the other hand, in the mobile terminal according to the present disclosure, when there exists a function linked to a virtual object contacted by a user, the controller may execute the relevant function. For example, when the virtual object of a portion that contacted by the user is an icon, it may be possible to execute a function linked to the relevant icon. In this case, an execution screen of a function linked to the relevant icon may be displayed on the display unit 451.

As described above, in a mobile terminal according to the present disclosure and a control method thereof, when a user's hand is in contact with or in proximity to a virtual object, a feedback signal may be output to a specific part of the user's hand in contact with the virtual object, thereby providing a realistic user experience such as actually touching the virtual object. Hereinafter, the present disclosure will be described in more detail based on the concept described above.

First, hereinafter, a method of modeling a virtual object and a user's hand to detect whether there is a contact and proximity of the user's hand with respect to the virtual object will be described in detail with reference to the accompanying drawings. 5A, 5B, and 5C are conceptual views illustrating a method of modeling (or rendering) a virtual object and a user's hand in a mobile terminal according to the present disclosure.

Figure 5A:
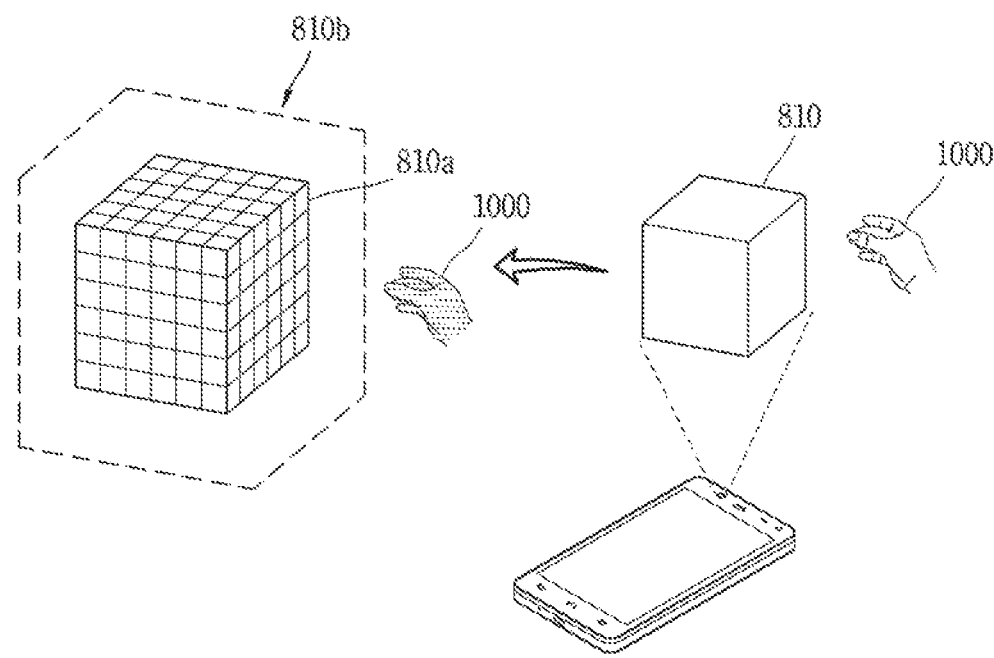
FIGS. 5A through 5C are conceptual views illustrating a method of modeling a virtual object and a user's hand in a mobile terminal according to the present disclosure.

In the mobile terminal according to the present disclosure, as illustrated in FIG. 5A, a user's hand sensed through the virtual object 810 and the image sensor may be respectively modeled.

At this time, as illustrated in FIG. 5A, the controller 180 may model a virtual object 810 and a virtual space including the virtual object 810, and additionally, the user's hand 1000. As illustrated in the drawing, as a result of modeling, there may exist a first modeling object 810*b* corresponding to the virtual space 810, a second modeling object 810*b* corresponding to a virtual space including the virtual object 810, and a third modeling object 1000*a* corresponding to the user's hand.

Meanwhile, the controller 180 may model the virtual object 810, the virtual space, and the sensed user's hand, apply a preset physical engine to the modeled objects, and perform collision detection, thereby detecting whether there is a collision between the user's hand and the virtual object 810.

For example, when the first, second, and third modeling objects 810*a*, 810*b*, 1000*a* are modeled, the controller 180 may acquire the coordinate information of the modeling object. The controller 180 may detect whether the user's hand is in contact with or in proximity to (or collision with) the virtual object 810 based on the acquired coordinate information of each modeling object. For example, the controller 180 may compare the coordinate information of a modeling object corresponding to the user's hand with the coordinate information of a modeling object corresponding to the virtual object, and determine that the user's hand is in contact with or in proximity to the virtual object when there is the same or similar coordinate information as a result of the comparison.

Moreover, the controller 180 may determine a relative position between the virtual object 810 and the user's hand using the coordinate information of the modeling objects.

In other words, the controller 180 may compare the coordinate information of the output position of the virtual object in a virtual space with the coordinate information of a user's hand in the virtual space, and determine whether the coordinate information of the user's hand is is the same as that of the virtual object 810, thereby determining that the human body is i) in proximity to, ii) in contact with or iii) passed through the virtual object.

As described above, the coordinate information of the first region where the virtual object 810 is located and a place where the user's hand is located on the virtual space in which the virtual object 810 is output may be acquired through modeling in a specific mode to the virtual object and the user's hand, respectively.

The modeling on the user's hand may denote capturing the user's hand through a plurality of 3D cameras (or a plurality of image sensors), and modeling an image object corresponding to the user's hand included in the plurality of captured images.

Hereinafter, various methods of modeling a user's hand and a virtual object will be described in detail with reference to the drawings.

Figure 5B:
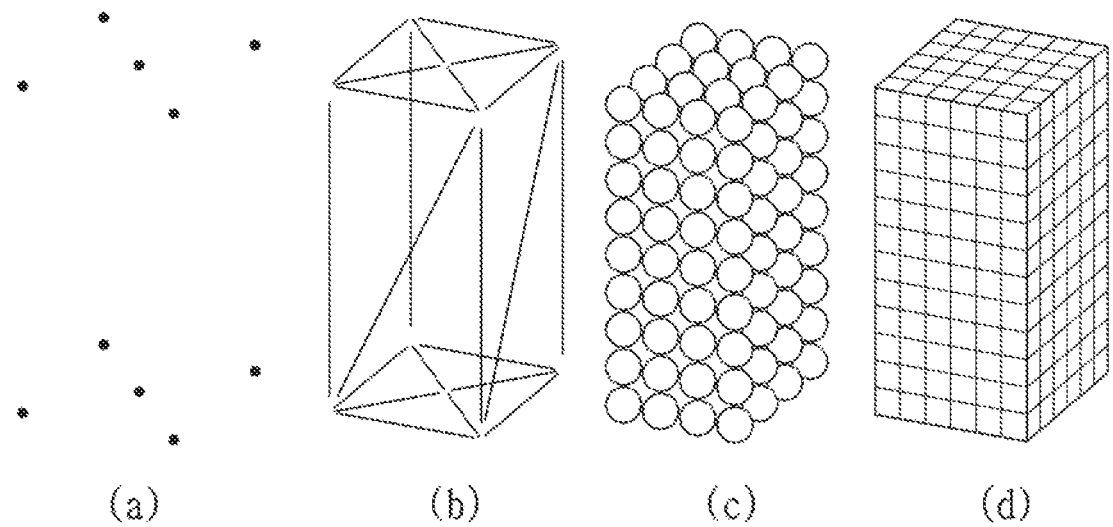

FIG. 5B is a conceptual view of examples of a plurality of modeling methods. The modeling on a virtual object may be carried out through any one of i) a vertex-based modeling method as illustrated in FIG. 5B(a), ii) a line (edge)-based modeling method as illustrated in FIG. 5B(b), iii) a sphere-based modeling method as illustrated in FIG. 5B(c), and iv) a mesh-based modeling method as illustrated in FIG. 5B(d).

As illustrated in FIG. 5B(a), according to the vertex-based modeling method, when the user desires to select a specific region of a virtual object, the controller 180 may activate the vertices of a portion corresponding to the specific region on the modeled virtual object to recognize whether there is the user's contact or proximity to the virtual object.

As illustrated in FIG. 5B(b), according to the line (edge)-based modeling method, when the user desires to select a specific region of a virtual object, the controller 180 may activate the lines of a portion corresponding to the specific region on the modeled virtual object to recognize whether there is the user's contact or proximity to the virtual object.

As illustrated in FIG. 5B(c), according to the sphere-based modeling method, when the user desires to select a specific region of a virtual object, the controller 180 may activate the spheres of a portion corresponding to the specific region on the modeled virtual object to recognize whether there is the user's contact or proximity to the virtual object.

As illustrated in FIG. 5B(d), according to the mesh-based modeling method, when the user desires to select a specific region of a virtual object, the controller 180 may activate the meshes of a portion corresponding to the specific region on the modeled virtual object to recognize whether there is the user's contact or proximity to the virtual object.

On the other hand, since the vertex-based modeling method, the line (edge)-based modeling method, the sphere-based modeling method, and the mesh-based modeling method are well known, the detailed description thereof will be omitted in this specification.

Meanwhile, the modeling methods for the virtual object and the virtual space may be the same or different.

Figure 5C:
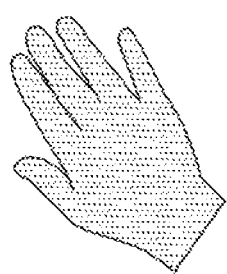
Figure 5C:
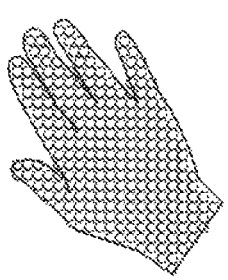
Figure 5C:
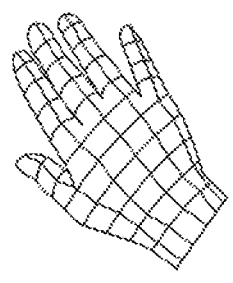

On the other hand, as illustrated in FIG. 5C, the user's hand may also be modeled in any one of the plurality of modeling methods. For example, the controller 180 may model the user's hand close to or in proximity to the virtual object through use a dot modeling method as illustrated in FIG. 5C(a), a sphere modeling method as illustrated in FIG. 5C(b), and a mesh modeling method as illustrated in FIG. 5C(c) using an image acquired from the 3D camera (or depth camera). As illustrated as a result of modeling, the shape of the user's hand may be present.

Furthermore, the controller 180 may model the user's hand through a ring, thimble or glove type sensor capable of recognizing the position, in addition to a method using the 3D camera.

Meanwhile, as illustrated in the drawing, the controller 180 detects whether the user's hand is in contact with or in proximity to the virtual object using a result of modeling the virtual object and the user's hand. The controller 180 determines whether the 3D point is included in a 3D point (or coordinate information) of the user's hand and a model of the virtual object (for example, a mesh model or the coordinate information of a model corresponding to the virtual object), acquired as a result of modeling. For another example, the controller 180 determines whether there is a sphere including the 3D point of the user's hand among the spheres constituting the virtual object, and detects the contact or proximity of a human body to the virtual object.

For still another example, the controller 180 determines whether there is a vertex or a line corresponding to the 3D point of a human body among vertexes or lines constituting the virtual object, and detects the contact or proximity of the human body to the virtual object.

On the other hand, the coordinate information of a virtual object and a surrounding region acquired based on the modeling result described above, and the coordinate information of the human body may have different coordinate values according to the respective modeling methods. For example, the coordinate of the sphere-based modeling and the coordinate of the line-based modeling may have different values.

Meanwhile, in the above description, it has been described whether it is determined that a model corresponding to the virtual object includes the 3D point of the human body, but it may be understood that "it is determined whether the 3D point, namely, the coordinate information of a modeling object corresponds to the coordinate information of a model corresponding to the virtual object".

On the other hand, in a mobile terminal according to the present disclosure, a virtual object may be modeled by a modeling method based on the characteristics of an object among a plurality of modeling methods. The controller 180 may perform modeling on the virtual object through a method determined based on the characteristics of an object corresponding to the virtual object among the plurality of modeling methods. Here, the characteristic of an object corresponding to the virtual object may include at least one of the type, weight, size, strength, shape, and surface of the object. For example, when the appearance of the object corresponding to the virtual object is monotonous, like a book, the controller 180 may model the virtual object using a relatively simple modeling method rather than a complicated modeling method. For another example, when the appearance of the object is complicated, the controller 180 may model the virtual object through a complicated modeling method in order to determine to which portion the user is accurately close or in proximity.

For example, in the case of a "book", the texture or shape is the same as a whole, and thus the user receives a similar tactile feeling regardless of which region is touched. Therefore, for an object having such characteristics, the controller 180 performs modeling using a modeling method whose processing is rather simple. In addition, for another example, in the case of a "cactus", the texture and shape are different as a whole, and thus the user receives a different tactile feeling depending on which area is touched. Accordingly, in such a case, the controller may allow more detailed modeling to be carried out on the entire virtual object.

On the other hand, the controller may perform modeling around a portion (for example, a button, a protruding portion (handle or the like) to be contacted on an object corresponding to the virtual object, and detect whether the user is in contact with or in proximity to the portion to be contacted using the modeling result.

In addition, the controller may perform a partly different modeling method even on a single virtual object, and a portion (for example, a button or a protruding portion) to be contacted may perform modeling in a more detailed modeling method than the other portions.

As described above, in a mobile terminal according to the present disclosure, the virtual object and the user's hand may be modeled to determine whether or not the virtual object is in contact with or in proximity to the user's hand, and output a feedback signal by the user's hand.

Hereinafter, a method of outputting a feedback signal to the user's hand using the result of the performed modeling will be described in more detail. FIGS. 6A through 6F are conceptual views for explaining a method of outputting g a feedback signal in a mobile terminal according to the present disclosure. FIGS. 7A and 7C are graphs illustrating signal characteristics of a feedback signal.

The controller 180 of the mobile terminal according to the present disclosure may output a feedback signal to transmit a feedback signal to the user's hand when the user's hand is in contact with or in proximity to the virtual object in the virtual space.

Figure 6A:
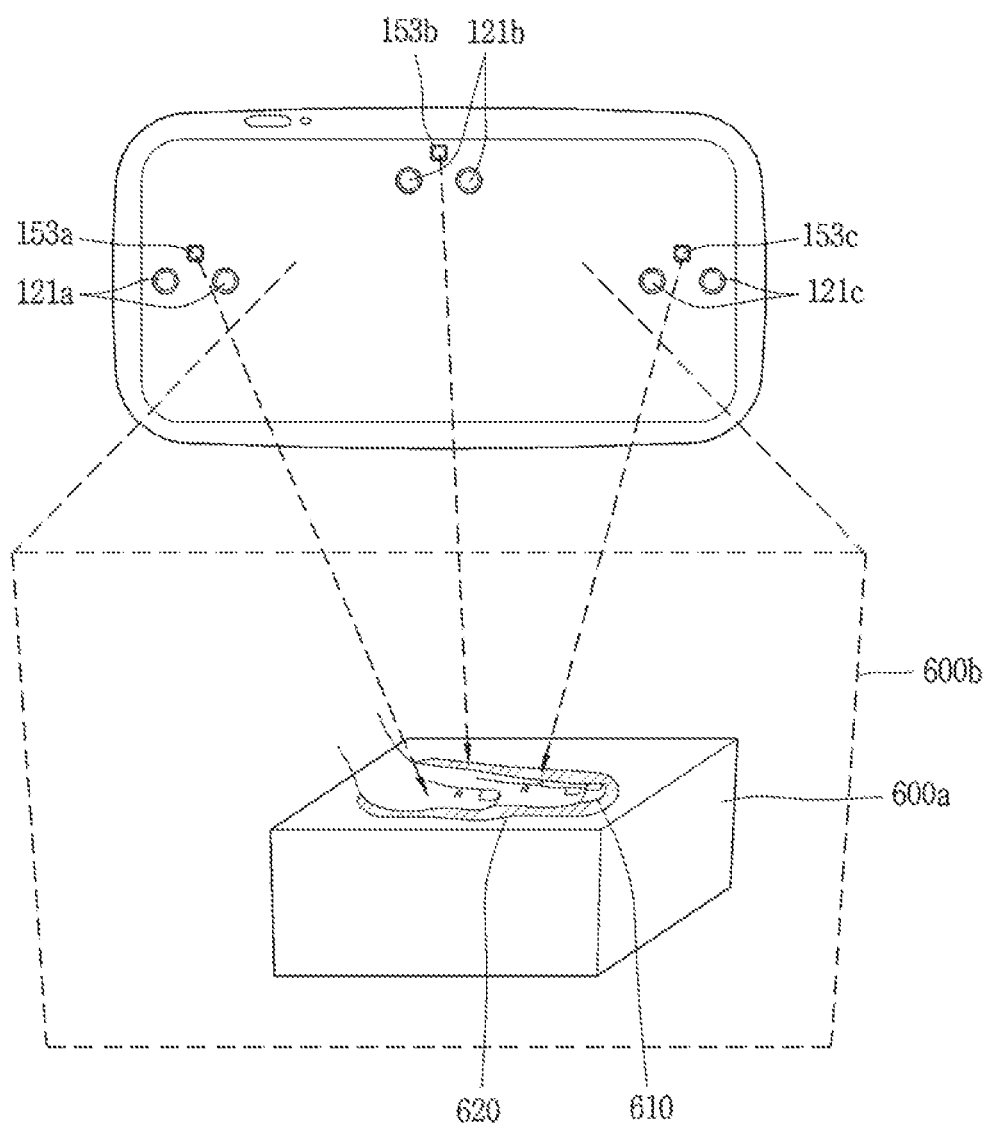
FIGS. 6A through 6F are conceptual views for explaining a method of transmitting a feedback signal to a user's hand in a mobile terminal according to the present disclosure.
Figure 7A:
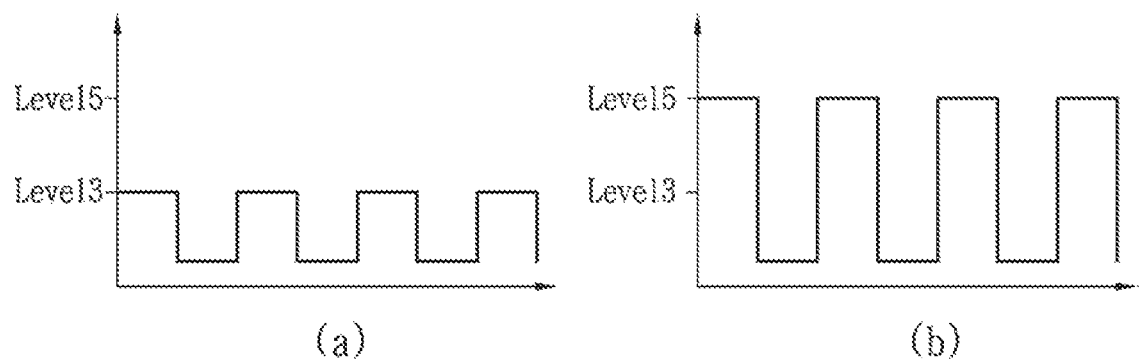
FIGS. 7A and 7C are graphs illustrating signal characteristics of a feedback signal.

For example, as illustrated in FIG. 6A, when it is detected that the user's hand 610 is in contact with the virtual object 600a in the virtual space 600b through the above-described modeling, the controller 180 may output a plurality of feedback signals to a specific region where the user's hand 610 and the virtual object 600a are in contact with each other.

More specifically, the controller 180 may generate a first modeling object, a second modeling object, and a third modeling object corresponding to the virtual object, the virtual space, and the user's hand 610, respectively. Then, the controller 180 may compare the coordinate information of the first modeling object corresponding to the virtual object with the coordinate information of the third modeling object corresponding to the user's hand in the second modeling object corresponding to the virtual space to detect a target region 620 having the same coordinate information as a result of the comparison.

Here, the target region 620 may be a region of the user's hand illustrating a specific part in contact with the virtual object. The target region 620 may vary depending on an area of the user's hand in contact with the virtual object or a gesture of the hand.

The target region 620 may be coordinate information corresponding to one point or may be a region consisting of coordinate information corresponding to a plurality of points when a plurality of points are gathered to form an area.

For example, as illustrated in FIG. 6A, when the user takes a gesture of rubbing a virtual object with his or her palm, the controller 180 may set the entire edge region of a modeling object corresponding to the user's hand as a target region.

Figure 6B:
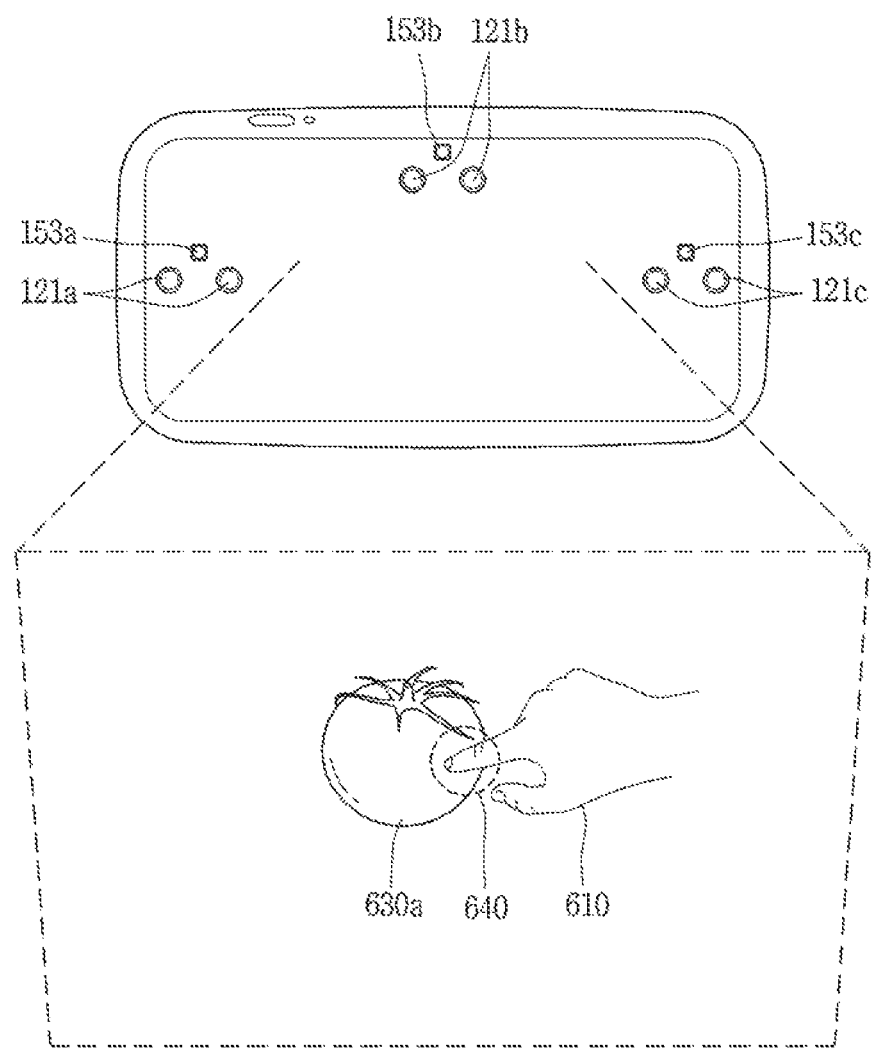

For another example, as illustrated in FIG. 6B, when the user takes a gesture indicating a virtual object with a specific finger, the controller 180 may set a partial region 640 modeling a specific finger of a modeling object corresponding to the user's hand (640) as a target region.

Then, the controller 180 may output a plurality of feedback signals to an edge of the target region 620 through a plurality of feedback signal units. Through this, the user may feel a feedback signal in the edge region of the hand closest to the palm. Therefore, the user may experience a feeling of touching an object with his or her palm.

Moreover, the present disclosure may transmit a feedback signal only to a specific part of a hand in contact with the virtual object to provide a user with an experience of seeming to be in contact with a real object.

On the other hand, the controller 180 may control the plurality of feedback signal units to output different feedback signals according to the gestures of the user's hand.

A feedback signal according to the present disclosure may be defined by at least one of intensity (e.g., strength or amplitude), period (e.g., frequency) and waveform (e.g., pulse wave, sine wave, etc.). In other words, the characteristics of the feedback signal are determined by a combination of the intensity, period, and waveform of the signal.

The controller 180 modifies at least one of the intensity, period, and waveform of the feedback signal to generate a different feedback signal through the feedback signal unit. In other words, under the control of the controller, the feedback signal unit may generate a different feedback signal in which at least one of the strength, period, and waveform of the signal is different.

Accordingly, when the feedback signal is formed of a laser or a sound wave, the controller 180 may control at least one of the intensity, amplitude, frequency, and waveform of the laser or the sound wave to generate a different feedback signal.

Figure 7B:
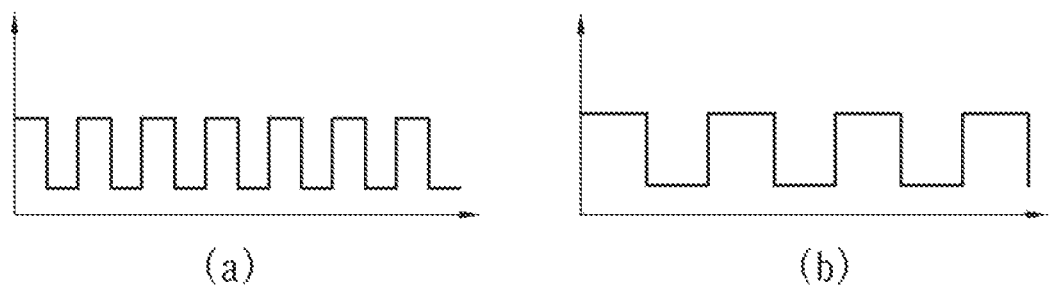
Figure 7C:
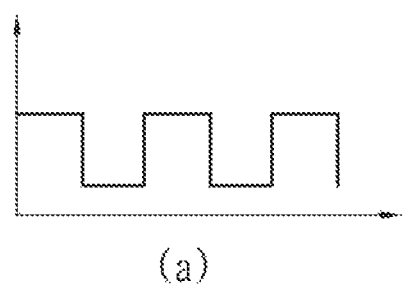
Figure 7C:
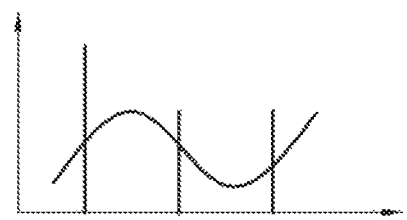
Figure 7C:
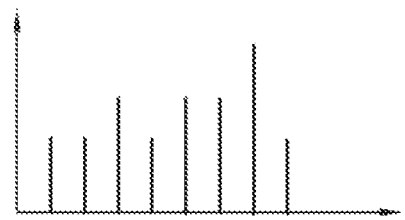
Figure 7C:
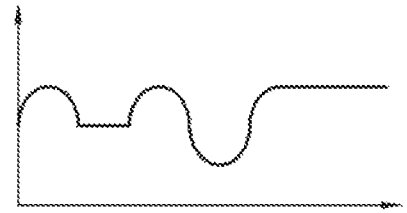

The intensity of the signal may denote either one of the intensity of the signal or the magnitude of the signal, as illustrated in FIG. 7A. The period of the signal means the frequency of the signal, as illustrated in FIG. 7B, and the signal illustrated in FIG. 7B(b) has a smaller frequency than that of FIG. 7B(a). For example, when the feedback signal is implemented by a laser, a number of times a laser signal having a frequency illustrated in FIG. 7B(a) is transmitted to a user's body is is larger than that having a frequency illustrated in FIG. 7B(b).

There may be various waveforms of the signal as illustrated in FIG. 7C, and there may exist a pulse wave, as illustrated in FIG. 7C(a), a sine wave, as illustrated in FIG. 7C(b), an impulse wave (or shock wave), as illustrated in FIG. 7C(c), or the like. In addition, as illustrated in FIG. 7C(d), there may exist a waveform combined with various waveforms. Moreover, even in the case of the same pulse waveform, different types of signals may exist depending on the pulse width.

On the other hand, the controller 180 may control the plurality of feedback signal units to output different feedback signals according to a preset condition. Here, the preset condition may be any one of a condition related to a size of the area of a specific part where the user's hand is in contact with the virtual object, and a condition related to a gesture of the user's hand.

For example, a plurality of feedback signal units may be controlled to output different feedback signals according to an area in which the user's hand and the virtual object are in contact with each other. More specifically, the controller 180 may output a low signal intensity of the feedback signal as an area of contact between the user's hand and the virtual object is increased. Here, the area may denote a size of the target region.

As illustrated in FIG. 6A, when the entire palm of the user being in contact with the virtual object is sensed, the controller 180 may output the signal intensity of the feedback signal at a first intensity.

On the contrary, as illustrated in FIG. 6B, when it is sensed that only a part of the user's finger 640 is in contact with the virtual object, the controller 180 may output the signal intensity of the feedback signal at a second intensity higher than the first intensity.

In other words, according to the present disclosure, as a contact area between the user's hand and the virtual object is decreased, a stronger feedback signal may be provided, thereby providing a more realistic virtual reality.

In addition, the controller 180 may output a different feedback signal according to a contact area between the user gesture and the virtual object. More specifically, the controller 180 may output a different feedback signal according to an area in which the virtual object is in contact with the user's hand, even when it is a gesture of the same user holding the virtual object. For example, FIGS. 6C and 6D both take a gesture in which a user holds a virtual object.

Figure 6C:
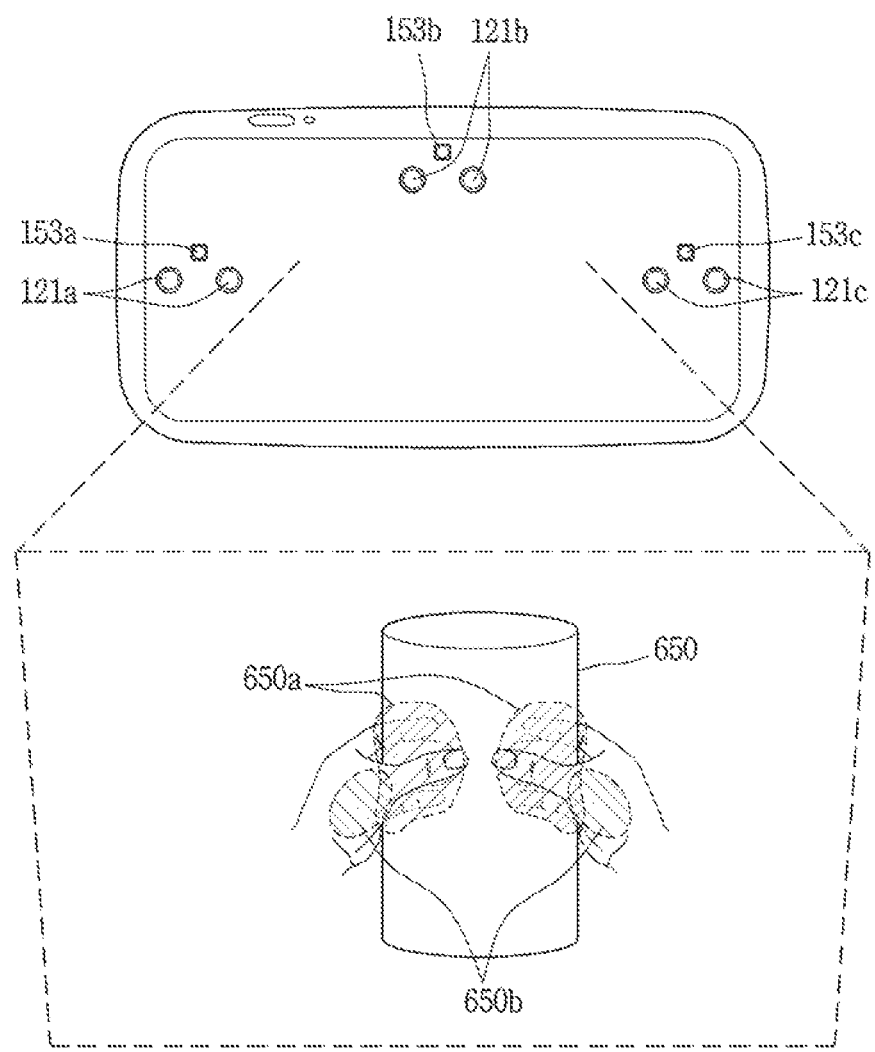
Figure 6D:
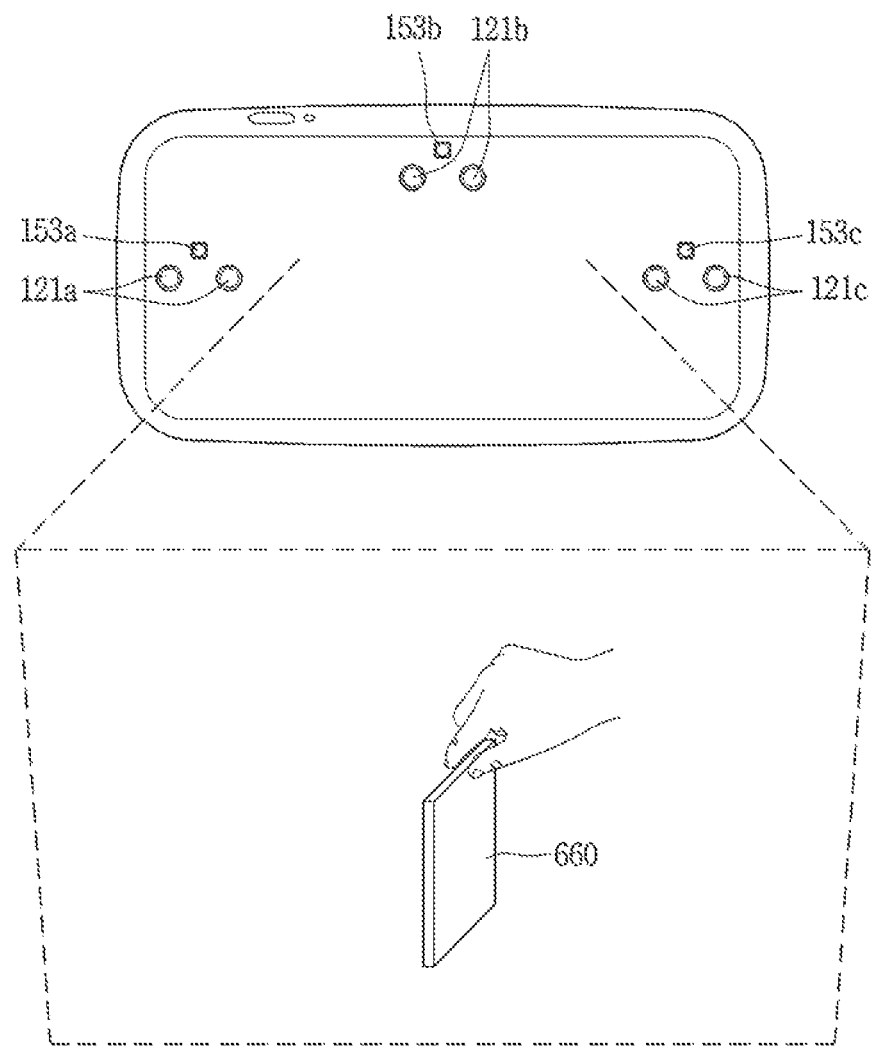

However, in the case of FIG. 6C, the user takes a gesture of collecting and holding the virtual object 650 by an entire hand, and in the case of FIG. 6D, the user takes a gesture of picking up the virtual object 660 with a specific finger. In other words, an area of contact between the virtual object and the user's hand may vary depending on the gesture of each drawing. In this case, the controller 180 may transmit a feedback signal having a lower signal intensity than a gesture illustrated in FIG. 6D, to a gesture illustrated in FIG. 6C.

In other words, according to the present disclosure, it may be determined that an external force actually applied by the user to pick up an object increases as an area of contact by the user's hand decreases to output a feedback signal having a higher intensity as the magnitude of the external force increases. Therefore, the user may feel the strength of the force applied to the virtual object in a more realistic manner through the intensity of the feedback signal.

Moreover, when the user's gesture is a gesture of holding a virtual object, the controller 180 may transmit a larger feedback signal as a relative distance between the virtual object and the user's hand decreases.

For example, as illustrated in FIG. 6C, the controller 180 may control the plurality of feedback signal units in such a manner that a feedback signal transmitted to a first region 650a having a smaller relative distance between the virtual object and the user's hand is higher than a feedback signal transmitted to a second region 650b having a larger relative distance between the virtual object and the user's hand on the target regions 650a, 650b in which the virtual object and the user's hand are in contact with each other. Therefore, according to the present disclosure, when a user hold a virtual object, it may be possible to provide an experience of applying a different force to each part of the hand.

Meanwhile, although not shown, the controller 180 may transmit a different feedback signal according to the user's gesture, even when an area of contact between the virtual object and the user's hand is the same. For example, when the user's gesture is a gesture of rubbing the virtual object, the controller 180 may output a feedback signal having a lower signal intensity than a gesture of picking up the virtual object, even when an area of contact between the virtual object and the user's hand is the same.

Figure 6E:
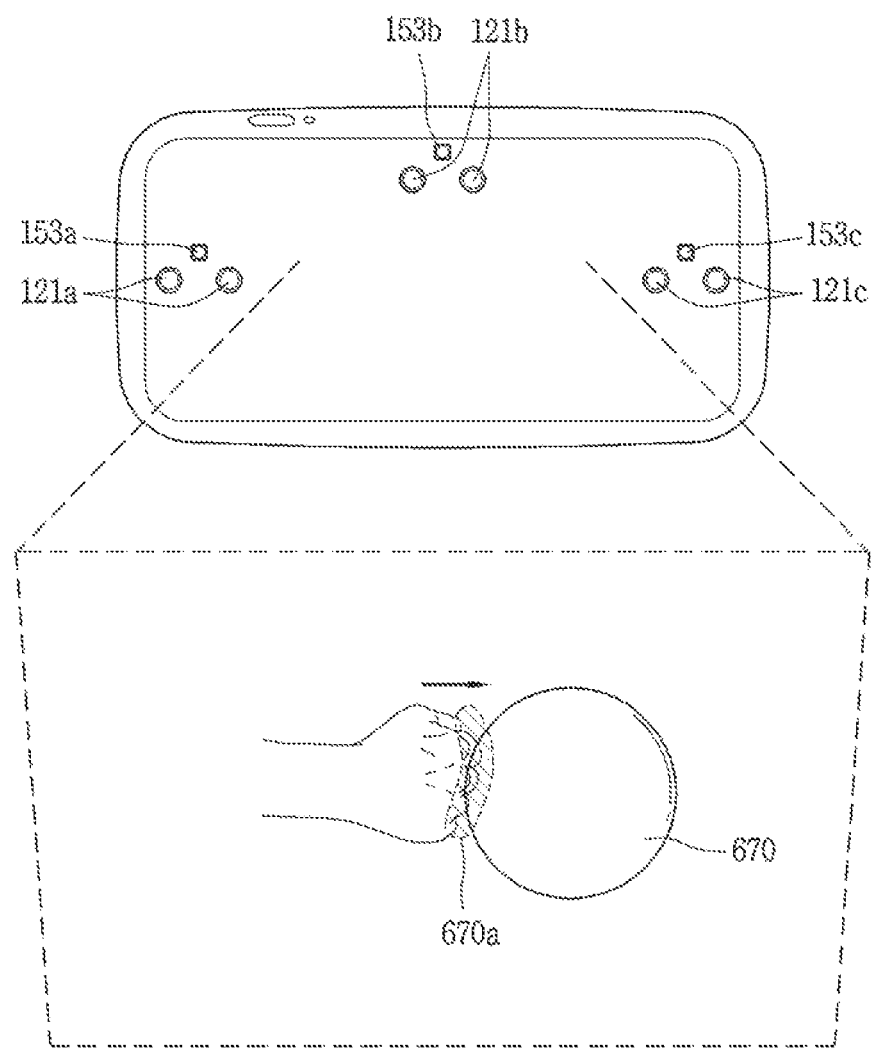

In addition, the controller 180 may output a different feedback signal according to a relative speed between the virtual object and the user's hand. For example, as illustrated in FIG. 6E, the user may take a gesture (or action) of striking a virtual object 670.

When the user takes a gesture of striking the virtual object 670, the controller 180 may detect a relative speed between the user's hand and the virtual object. Furthermore, the controller 180 may detect a target region 670a corresponding to a portion where the user's hand and the virtual object are in contact with each other.

Then, the controller 180 may transmit a feedback signal to a target region corresponding to a portion where the user's hand is in contact with the virtual object, at a point of time when the user's hand is brought into contact with the virtual object.

At this time, the feedback signal may be determined according to a relative speed at which the user's hand approaches the virtual object. For example, the controller 180 may transmit a feedback signal at a first intensity when the user's hand approaches the virtual object at a first speed, and, and transmit a feedback signal at a second intensity greater than the first intensity when approaching at a second speed greater than the first speed.

Accordingly, the user may experience a higher feedback signal when striking the virtual object strongly, and experience a lower feedback signal when striking the virtual object weakly.

Figure 6F:
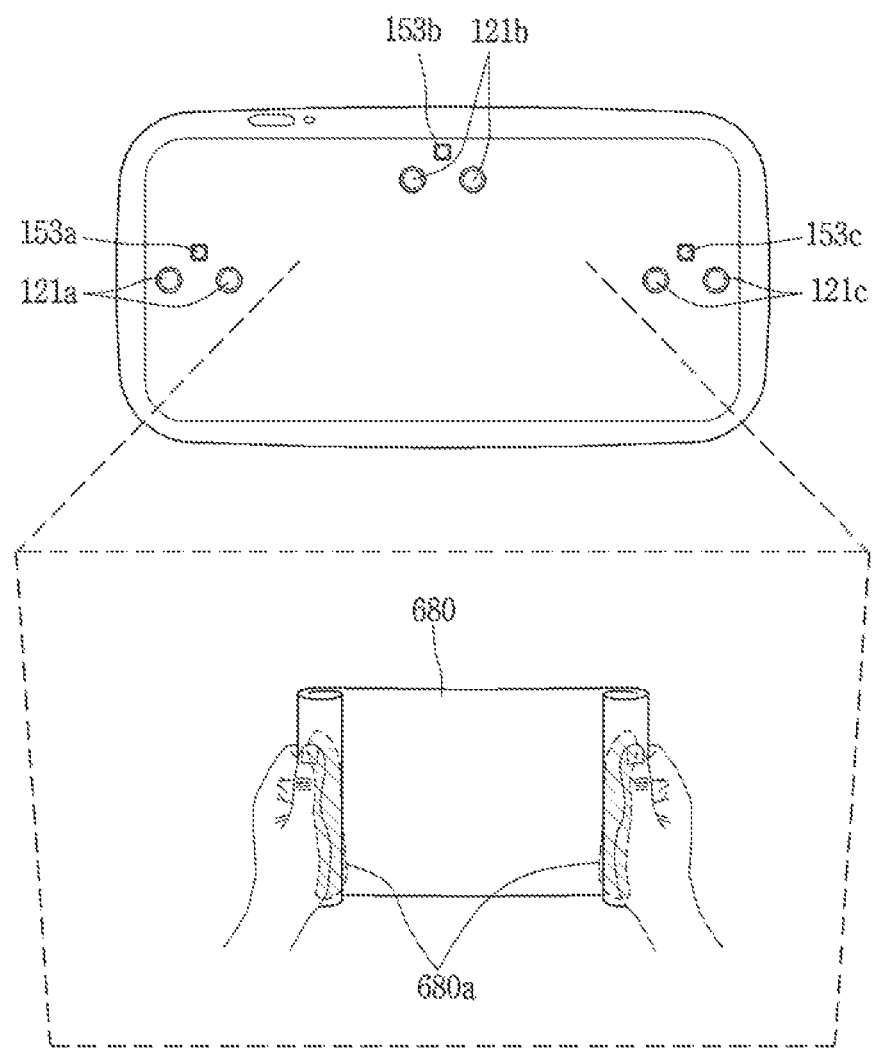

In addition, when the user takes a gesture of unfolding a virtual object, the controller 180 may set an area closest to the bottom of the hand as a target region, and output a feedback signal to the target region. For example, as illustrated in FIG. 6F, when a user gesture of unfolding the virtual object 680 is sensed, the controller 180 may detect a target region 680a in which the virtual object is in contact with the user's hand. The target region 680a may be a region closest to the bottom surface of the user's hand. Then, the controller 180 may control the feedback signal unit to transmit a feedback signal to the bottom surface of the hand.

In the above, a method of outputting a feedback signal to the user's hand using the result of the performed modeling has been described. Through this, the user may experience a more realistic interaction with the virtual object in the virtual reality.

Figure 8A:
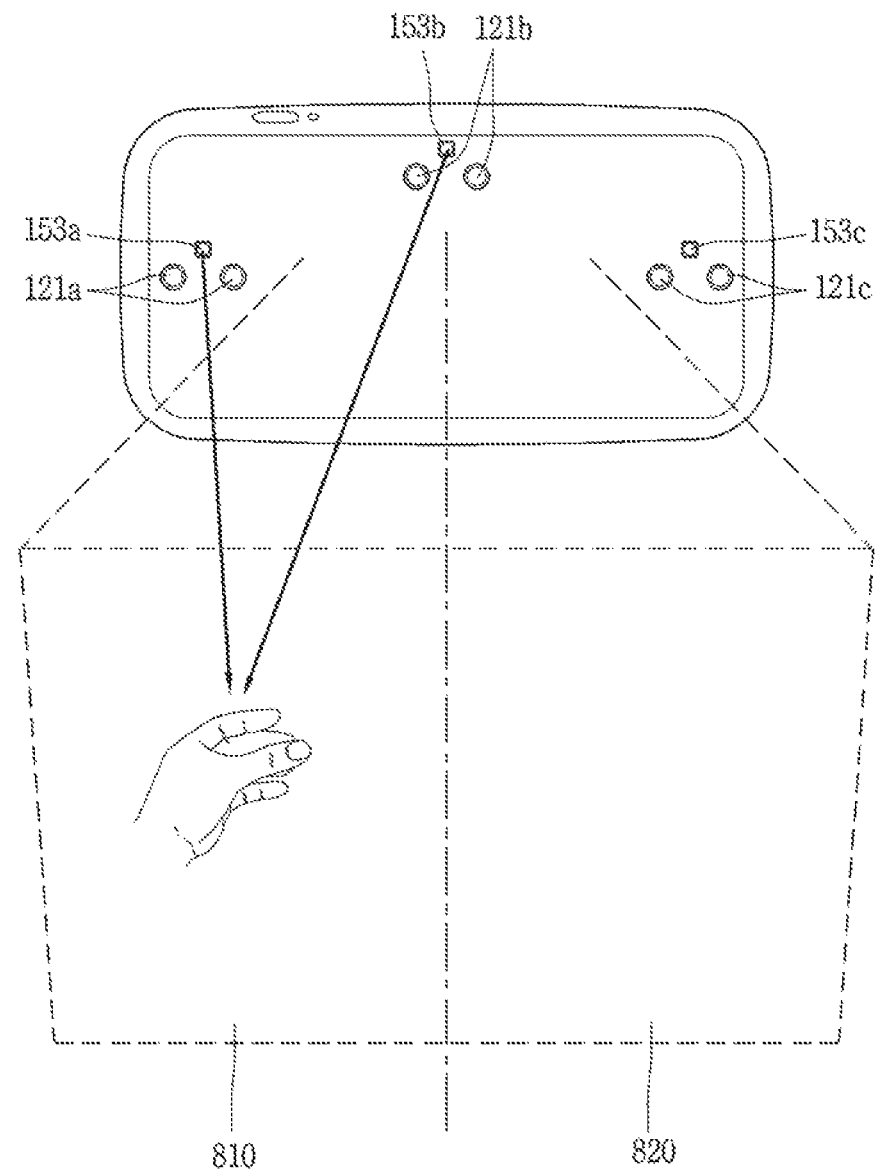
FIGS. 8A, 8B and 8C are conceptual views illustrating a method in which a user's hand provides feedback according to its position.
Figure 8B:
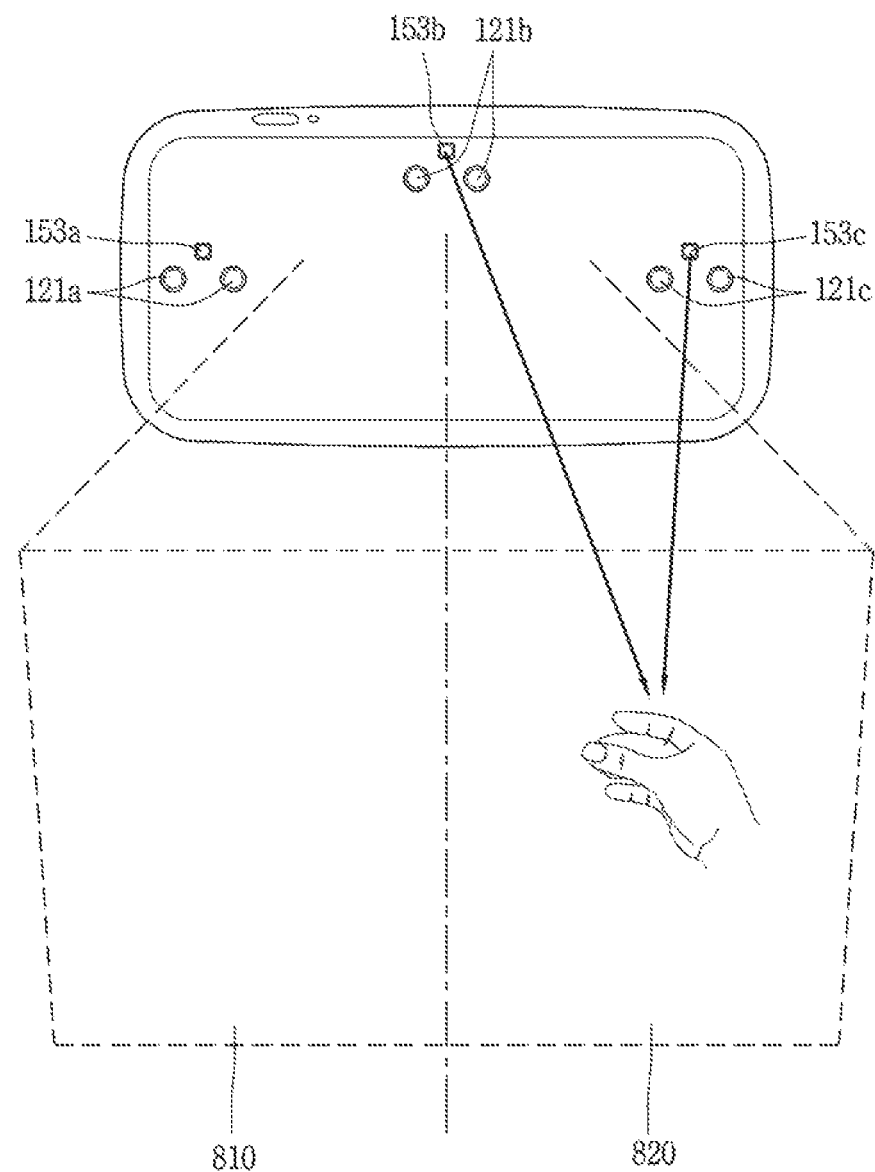
Figure 8C:
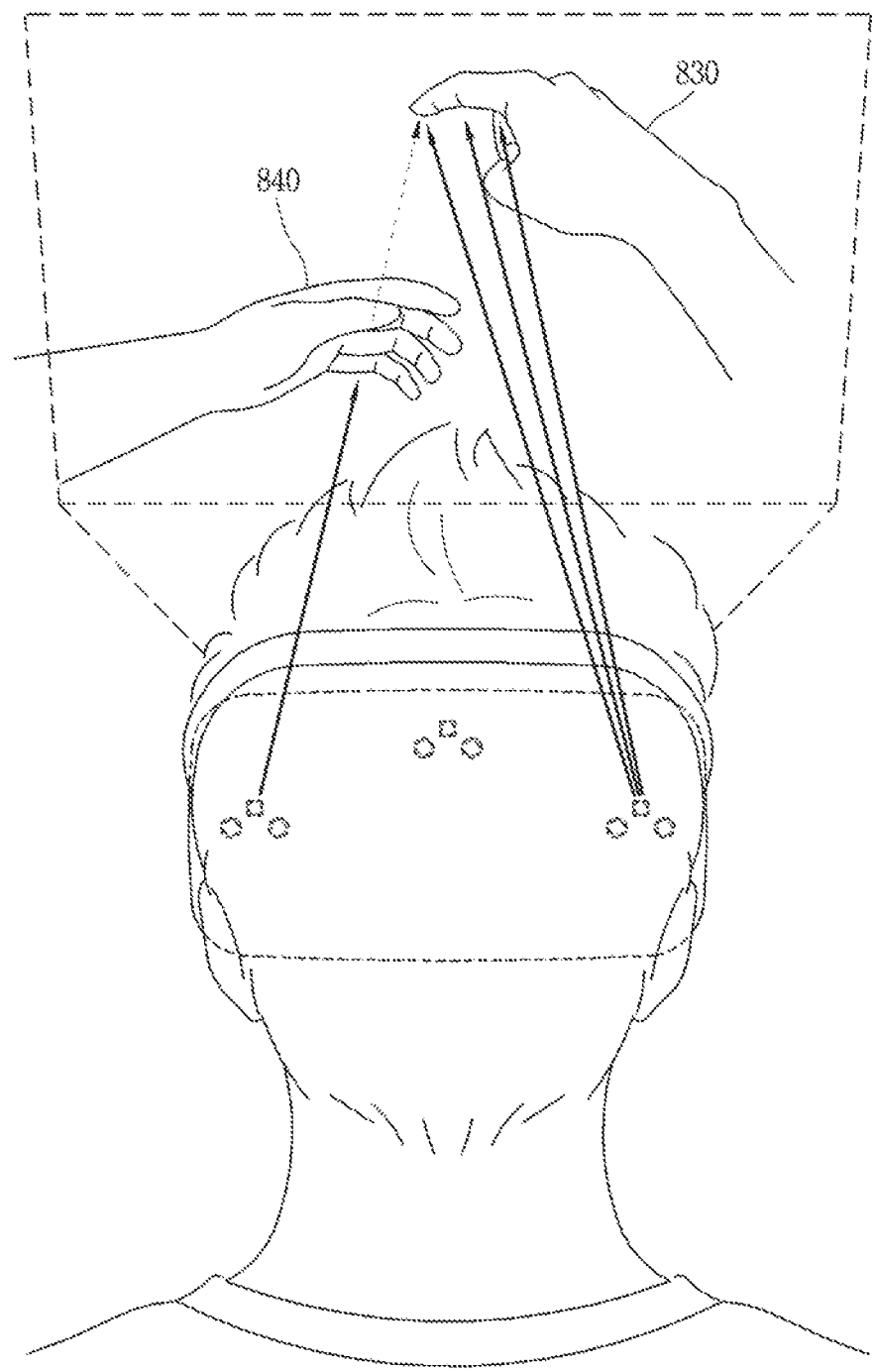

Hereinafter, a method of providing feedback in accordance with the position of the user's hand in the virtual space will be described. FIGS. 8A, 8B and 8C are conceptual views illustrating a method in which a user's hand provides feedback according to its position.

The controller 180 of the mobile terminal according to the present disclosure may transmit feedback signals to a user's hand using a plurality of feedback signal units 153a, 153b, 153c.

At this time, the controller 180 may determine part of the feedback signal units for transmitting feedback signals among the plurality of feedback signal units 153a, 153b, 153c, based on a preset criterion.

The preset criterion may be a criterion related to the virtual space, or a criterion related to the position of the user's hand. For example, the preset criterion may be a criterion related to a region in which a user's hand is located among a plurality of regions partitioned in the virtual space. For another example, the preset criterion may be a criterion related to a relative position of a hand in the virtual space.

The controller 180 may activate only the determined part of the feedback signal units, and deactivate the remaining part of the feedback signal units based on the preset criterion. Then, the controller 180 may output a feedback signal using the activated feedback signal unit. At this time, the inactive feedback signal unit may not output a feedback signal. Through this, the present disclosure may reduce power consumption through the feedback signal unit.

Referring to FIG. 8A, the controller 180 may divide the virtual space into a plurality of regions. For example, as illustrated in FIG. 8A, the virtual space may be partitioned into a first region 810 and a second region 820.

At this time, the controller 180 may activate only a specific feedback signal unit among a plurality of feedback signal units according to a region where the hand is located in the virtual space. For example, as illustrated in FIG. 8A, when it is sensed that a hand is located in the first region 810, the controller 180 may activate the first feedback signal unit 153*a* and the second feedback signal unit 153*b*, and deactivate the third feedback signal unit 153*c*.

For another example, as illustrated in FIG. 8B, when it is sensed that a hand is located in the first region 820, the controller 180 may activate the first feedback signal unit 153*a* and the second feedback signal unit 153*c*, and deactivate the third feedback signal unit 153*c*.

Meanwhile, the controller 180 may detect the position of the user's hand in the virtual space through a plurality of cameras 121*a*, 121*b*, 121*c*. For example, the controller 180 may acquire a plurality of images of the user's hand at different angles through the plurality of cameras 121*a*, 121*b*, 121*c*, and perform modeling using the modeling method described above with reference to FIGS. 5A and 5E. Then, the controller 180 may determine the position of the hand in the virtual space using the modeled image of the hand.

When a plurality of hands are sensed in the virtual space, the controller 180 may transmit a feedback signal to a specific hand among the plurality of hands in the virtual space. When a feedback signal is transmitted to a specific hand among the plurality of hands, the controller 180 may determine at least one feedback signal unit to transmit a feedback signal to a specific hand among the plurality of feedback signal units, based on a relative position between the specific hand and the remaining hands.

More specifically, the controller 180 may acquire a plurality of images that have captured a plurality of hands at different angles through the plurality of cameras 121*a*, 121*b*, 121*c*, and model each of the plurality of hands using the plurality of acquired images.

Then, the controller 180 may produce a relative position between modeling objects corresponding to each of the plurality of hands, between the modeling objects corresponding to the plurality of hands, respectively, and the mobile terminal. Here, the relative position may include a relative distance.

The controller 180 may activate only a specific feedback signal unit 153*c* among the plurality of feedback signal units 153*a*, 153*b*, 153*c* based on a relative distance between modeling objects corresponding to each of the plurality of hands and the mobile terminal. For example, when it is required to transmit a feedback signal to a specific hand, the controller 180 may activate a feedback signal unit positioned closest to a modeling object corresponding to a specific hand among the plurality of feedback signal units 153*a*, 153*b*, 153*c*.

Furthermore, when a modeling object corresponding to the specific hand is located between a modeling object corresponding to the other hand to which a feedback signal is to be transmitted, the controller 180 may activate a specific feedback signal unit among the plurality of feedback signal units 153*a*, 153*b*, 153*c*. Here, the specific feedback signal unit may be a feedback signal unit in which a modeling object corresponding to the other hand is not located on an output path through which a signal is output.

For example, as illustrated in FIG. 8C, the controller 180 may sense a modeling object 840 corresponding to the other hand between a modeling object 830 corresponding to the specific hand and the mobile terminal. In this case, based on the output path of the feedback signals of the plurality of feedback signal units 153*a*, 153*b*, 153*c*, the controller 180 may determine a third feedback signal unit 153*c* having an output path that does not pass through the position of the other hand. Then, the controller 180 may output a feedback signal through the third feedback signal unit 153*c*. Therefore, the controller 180 may transmit a feedback signal to the specific hand without being disturbed by the other hand through the third feedback signal unit 153*c*.

Meanwhile, when a feedback signal is applied to the specific hand through only the specific feedback signal unit, the controller 180 may control the specific feedback signal unit such that the specific feedback signal unit sequentially outputs signals to different portions of the specific hand.

For example, when outputting a feedback signal through the third feedback signal unit 153*c*, the controller 180 sequentially outputs feedback signals from a thumb edge to a little finger edge of the specific hand through the third feedback signal unit 153*c*. Thus, the user may have a feeling like receiving a feedback signal at an edge of the entire hand.

Through this, the present disclosure may transmit a feedback signal to the user using an appropriate feedback signal unit among the plurality of feedback signal units.

Figure 9:
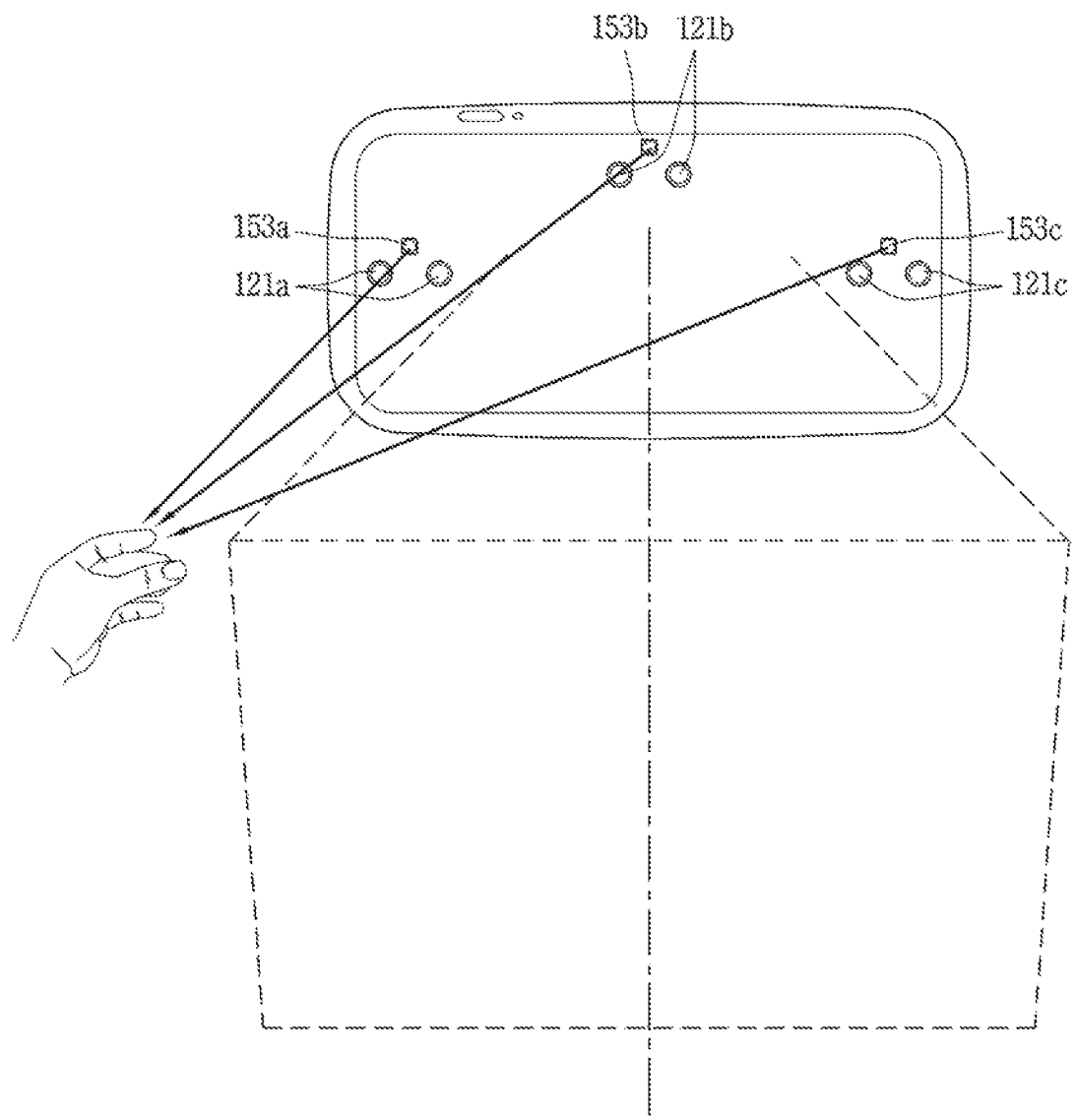
FIG. 9 is a conceptual view illustrating a method of transmitting a feedback signal to a user's hand located out of a virtual space.

Hereinafter, a method of transmitting a feedback signal to a user's hand located out of a virtual space will be described. FIG. 9 is a conceptual view illustrating a method of transmitting a feedback signal to a user's hand located out of a virtual space.

The controller 180 of the mobile terminal according to the present disclosure may transmit a feedback signal not only to a user's hand located in a virtual space but also to a user's hand located out of the virtual space.

When the user's hand is not located in the virtual space, the controller 180 may sense the user's hand out of the virtual space through a plurality of cameras 121*a*, 121*b*, 121*c* in real time or at preset intervals. Alternatively, when an event occurs on the mobile terminal, the controller 180 may sense the position of the user's hand outside the virtual space.

For example, as illustrated in FIG. 9, the controller 180 may sense a user's hand located out of the virtual space through the plurality of cameras 121*a*, 121*b*, 121*c*.

The controller 180 may transmit a feedback signal to the user's hand when an event occurs on the mobile terminal while the user's hand is located out of the virtual space.

The event may be an event occurring on the mobile terminal, and may include an event in which a message or a call signal is received, an event in which a preset alarm occurs, and the like.

For example, when there is an event of receiving a message from an external terminal while the user's hand is located out of the virtual space, the controller 180 may transmit a feedback signal to the user's hand or the like located out of the virtual space.

Moreover, the controller 180 may transmit a different feedback signal according to the identification information of an external terminal that has received the message. For example, the controller 180 may control a feedback signal unit to output a feedback signal at a first intensity when the message is received from A, and output a feedback signal at a second intensity when the message is received from B.

Alternatively, when the user's hand is located out of the virtual space while the virtual space is displayed on the display unit 451, the controller 180 may transmit a feedback signal to the user's hand or the like located out of the virtual space. More specifically, when an event related to the virtual object included in the virtual space occurs while the user's hand is located out of the virtual space, the controller 180 may control the plurality of feedback signal units to transmit feedback signals to the user's hand. The event related to the virtual object may be an event in which the virtual object is refreshed, an event in which the type and color of the virtual object are changed, and the like. The refresh is an operation of the mobile terminal that updates the virtual object with new information received through communication or new information stored in the memory.

For example, when the virtual object is refreshed in the virtual space, the controller 180 may output a feedback signals to transmit the feedback signals to the user's hand or the like through the plurality of feedback signal units.

In the above, a method of transmitting a feedback signal when the user's hand is located out of the virtual space has been described.

The foregoing present disclosure may be implemented as codes readable by a computer on a medium written by the program. The computer-readable media includes all types of recording devices in which data readable by a computer system can be stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller 180 of the electronic device. The foregoing embodiments are merely exemplary and are not to be considered as limiting the present disclosure. The scope of the invention should be determined by reasonable interpretation of the appended claims and all changes that come within the equivalent scope of the invention are included in the scope of the invention.

What is claimed is:

1. A mobile terminal, comprising:
   a main body formed to be worn on a head of a user;
   a display unit disposed on a front surface of the main body, and configured to display a virtual space including a virtual object;
   a plurality of cameras configured to sense a hand of the user present in the virtual space;
   a plurality of feedback signal units spaced apart from each other and configured to output feedback signals in different directions; and
   a controller configured to:
      detect a specific part of the user's hand in contact with or in proximity to the virtual object based on a plurality of sensing information received from the plurality of cameras when the user's hand is in contact with or in proximity to the virtual object included in the virtual space;
      control the plurality of feedback signal units to transmit feedback signals having different directions to the specific part of the user's hand;
      detect a gesture of the user's hand;
      cause the plurality of feedback signal units to output a different feedback signal according to the gesture of the user's hand; and
      cause the plurality of feedback signal units to output a feedback signal having a lower signal intensity than a gesture of picking up the virtual object, even when an area of contact between the virtual object and the user's hand is same, when the gesture comprises rubbing the virtual object.

2. The mobile terminal of claim 1, wherein the plurality of feedback signal units are disposed in an edge region of the main body to output feedback signals to an edge of the specific part of the user's hand.

3. The mobile terminal of claim 1, wherein the plurality of cameras are spaced apart from each other to sense the user's hand at different angles.

4. The mobile terminal of claim 1, wherein the controller outputs a different feedback signal according to an area of the specific part of the user's hand in contact with or in proximity to the virtual object.

5. The mobile terminal of claim 4, wherein the controller changes at least one of a frequency, an amplitude, or a waveform of the feedback signal to output the different feedback signal.

6. The mobile terminal of claim 1, wherein the controller causes the plurality of feedback signal units to:
   output a feedback signal at a first intensity when a relative distance between the virtual object and the specific part of the user's hand is a first distance; and
   output a feedback signal at a second intensity lower than the first intensity when a relative distance between the virtual object and a part different from the specific part of the user's hand is a second distance larger than the first distance.

7. The mobile terminal of claim 1, wherein the controller detects a position of the user's hand in the virtual space, and determines at least one feedback signal unit among the plurality of feedback signal units to output a feedback signal according to the position of the user's hand.

8. The mobile terminal of claim 1, wherein when at least one of the plurality of feedback signal units is controlled not to output a feedback signal based on a preset condition, the controller controls remaining feedback signal units among the plurality of feedback signal units, excluding the at least one feedback signal unit, to sequentially output feedback signals to the specific part.

9. The mobile terminal of claim 8, wherein the preset condition is a condition in which either one of the user's hands present in the virtual space is located between another one of the user's hands and an output path of a signal of a specific feedback signal unit.

10. The mobile terminal of claim 1, wherein the controller generates a virtual image corresponding to the user's hand based on a plurality of sensing information received from the plurality of cameras, and determines whether the virtual object is in contact with or in proximity to the virtual object based on a relative distance between the virtual image and the virtual object.

11. The mobile terminal of claim 1, wherein the controller outputs a different feedback signal according to a type of the virtual object when the virtual object and the user's hand are in contact or in proximity to each other.

12. The mobile terminal of claim 1, wherein the controller controls the plurality of feedback signal units to limit the feedback signal from reaching a part of the user's hand excluding the specific part.

13. The mobile terminal of claim 1, wherein when notification information related to the virtual object is generated in a state where the user's hand present outside of the virtual space is sensed, the controller controls the plurality of feedback signal units to allow feedback signals to reach a back of the user's hand.

14. The mobile terminal of claim 1, wherein the controller is further configured to:
   determine that the user's hand is holding the virtual object when the virtual object and the user's hand are in contact with each other; and
   cause the plurality of feedback signal units to output a different feedback signal according to a relative position between the virtual object and each of a plurality of parts of the user's hand when it is determined that the virtual object is held by the user's hand.

15. A control method of a mobile terminal, the method comprising:
- displaying a virtual space including a virtual object;
- sensing a user's hand present in the virtual space through a plurality of cameras;
- detecting a specific part of the user's hand in contact with or in proximity to the virtual object based on a plurality of sensing information received from the plurality of cameras when the user's hand is in contact with or in proximity to the virtual object included in the virtual space;
- outputting feedback signals through a plurality of feedback signal units to allow feedback signals having different directions to reach the specific part of the user's hand;
- detecting a gesture of the user's hand;
- causing the plurality of feedback signal units to output a different feedback signal according to the gesture of the user's hand; and
- outputting a feedback signal having a lower signal intensity than a gesture of picking up the virtual object, even when an area of contact between the virtual object and the user's hand is same, when the gesture comprises rubbing the virtual object.

16. The method of claim 15, wherein the plurality of feedback signal units are spaced apart from each other.

17. The method of claim 15, wherein said outputting feedback signals causes the plurality of feedback signal units not to output feedback signals to remaining parts among the plurality of parts, excluding the specific part of the user's hand.

18. The method of claim 15, wherein when the feedback signals are output, a different feedback signal is output according to an area of the specific part of the user's hand in contact with or in proximity to the virtual object.

19. The method of claim 15, wherein when the feedback signals are output, a different feedback signal is output according to a shape of the user's hand in contact with or in proximity to the virtual object.

* * * * *